US010446036B2

(12) United States Patent
Kanai et al.

(10) Patent No.: US 10,446,036 B2
(45) Date of Patent: Oct. 15, 2019

(54) TRAFFIC CONTROL SYSTEM, TRAFFIC CONTROL DEVICE, AND ON-BOARD TERMINAL DEVICE

(71) Applicant: HITACHI CONSTRUCTION MACHINERY CO., LTD., Tokyo (JP)

(72) Inventors: Masaki Kanai, Tokyo (JP); Manabu Katou, Tokyo (JP); Tomoyuki Hamada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 167 days.

(21) Appl. No.: 15/736,038

(22) PCT Filed: Mar. 9, 2016

(86) PCT No.: PCT/JP2016/057470
§ 371 (c)(1),
(2) Date: Dec. 13, 2017

(87) PCT Pub. No.: WO2016/203796
PCT Pub. Date: Dec. 22, 2016

(65) Prior Publication Data
US 2018/0182248 A1 Jun. 28, 2018

(30) Foreign Application Priority Data
Jun. 17, 2015 (JP) ................. 2015-122022

(51) Int. Cl.
*G08G 1/16* (2006.01)
*B60R 21/00* (2006.01)
(Continued)

(52) U.S. Cl.
CPC ............. *G08G 1/167* (2013.01); *B60R 21/00* (2013.01); *G08G 1/00* (2013.01); *G08G 1/0969* (2013.01);
(Continued)

(58) Field of Classification Search
CPC .. G05D 1/027; G05D 2201/021; G05D 1/024; G05D 1/0272; G05D 1/0278; G05D 1/0297; G05D 1/0055
See application file for complete search history.

(56) References Cited

U.S. PATENT DOCUMENTS 6,292,725 B1 *  9/2001  Kageyama ............. G05D 1/027
                                                      180/169
6,480,769 B1 * 11/2002  Kageyama ............. G08G 1/207
                                                      701/23
(Continued)

FOREIGN PATENT DOCUMENTS

JP  2007-323675 A  12/2007
JP       5714129 B1   5/2015
WO  2016/051818 A1   4/2016

OTHER PUBLICATIONS

International Search Report of PCT/JP2016/057470 dated May 17, 2016.

*Primary Examiner* — Redhwan K Mawari
(74) *Attorney, Agent, or Firm* — Mattingly & Malur, PC

(57) ABSTRACT

A traffic control system for a manned vehicle, traveling on one of plural lanes arranged side by side in a mine, and a traffic control device connected with the vehicle. A zone of the lane, on which the vehicle is traveling, is set as a first travel-permitted zone with a travel permission given to the vehicle only. Upon receipt of a request from the vehicle for a travel-permitted zone of another-lane with a travel permission given only to the vehicle on a lane adjacent the lane on which the vehicle is traveling, the traffic control device sets, as the travel-permitted zone of the another-lane, a zone including at least a part of a zone arranged on the adjacent lane side by side with the first travel-permitted zone, and transmits the travel-permitted zone of the another-lane to the vehicle, which the vehicle displays on a display screen.

10 Claims, 19 Drawing Sheets

(51) Int. Cl.
*G08G 1/00* (2006.01)
*G08G 1/0969* (2006.01)
*G08G 1/0968* (2006.01)
*G08G 1/0967* (2006.01)

(52) U.S. Cl.
CPC . *G08G 1/096716* (2013.01); *G08G 1/096775* (2013.01); *G08G 1/096855* (2013.01); *G08G 1/16* (2013.01); *G08G 1/166* (2013.01); *G08G 1/207* (2013.01); *G08G 1/096822* (2013.01)

(56) References Cited

U.S. PATENT DOCUMENTS

| | | | | |
|---|---|---|---|---|
| 7,656,311 B2* | 2/2010 | Holmes | G01S 5/0289 | 340/988 |
| 7,734,386 B2* | 6/2010 | DelNero | G05D 1/0088 | 244/152 |
| 7,742,853 B2* | 6/2010 | Mori | G01C 21/005 | 701/117 |
| 7,853,402 B2* | 12/2010 | Makela | G01S 5/02 | 340/941 |
| 7,885,766 B2* | 2/2011 | Sugimoto | G08G 1/166 | 701/301 |
| 8,022,663 B2* | 9/2011 | Davis | B60L 7/24 | 320/104 |
| 8,050,859 B2* | 11/2011 | MacHino | G08G 1/096827 | 701/415 |
| 8,135,496 B2* | 3/2012 | Hayashi | G05D 1/0297 | 700/229 |
| 8,170,739 B2* | 5/2012 | Lee | B62D 15/025 | 340/435 |
| 8,459,619 B2* | 6/2013 | Trinh | B60G 17/0155 | 267/64.23 |
| 8,840,190 B2* | 9/2014 | Stokes | E21C 41/26 | 299/1.9 |
| 8,947,531 B2* | 2/2015 | Fischer | G01S 7/003 | 348/148 |
| 8,954,241 B2* | 2/2015 | Ruth | G05D 1/0225 | 701/50 |
| 9,420,203 B2* | 8/2016 | Broggi | G01S 17/023 | |
| 9,766,637 B2* | 9/2017 | Kou | E21C 47/00 | |
| 9,804,606 B2* | 10/2017 | Kanai | G05D 1/02 | |
| 2016/0121904 A1* | 5/2016 | Prakah-Asante | B60W 50/00 | 701/1 |

* cited by examiner

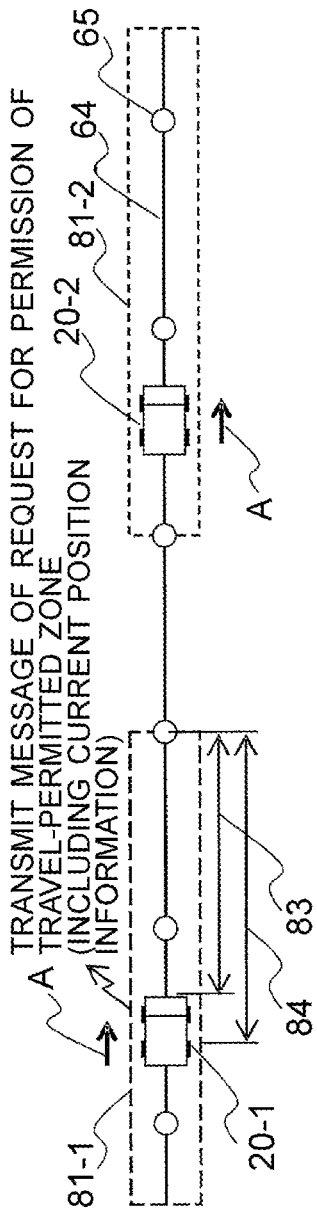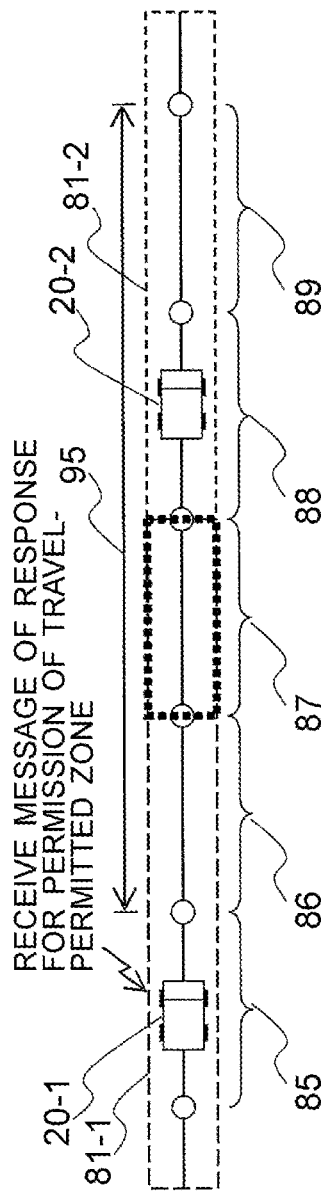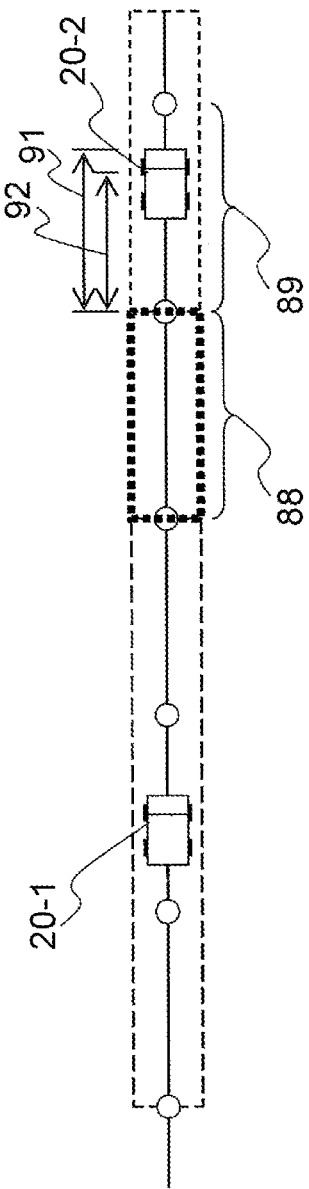

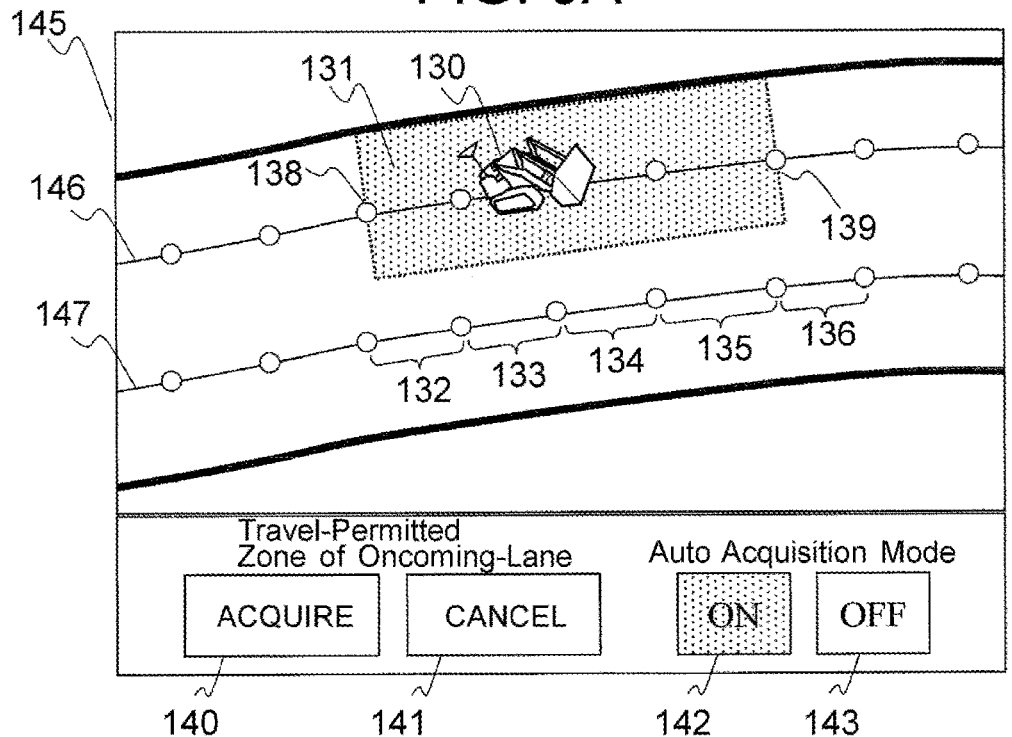
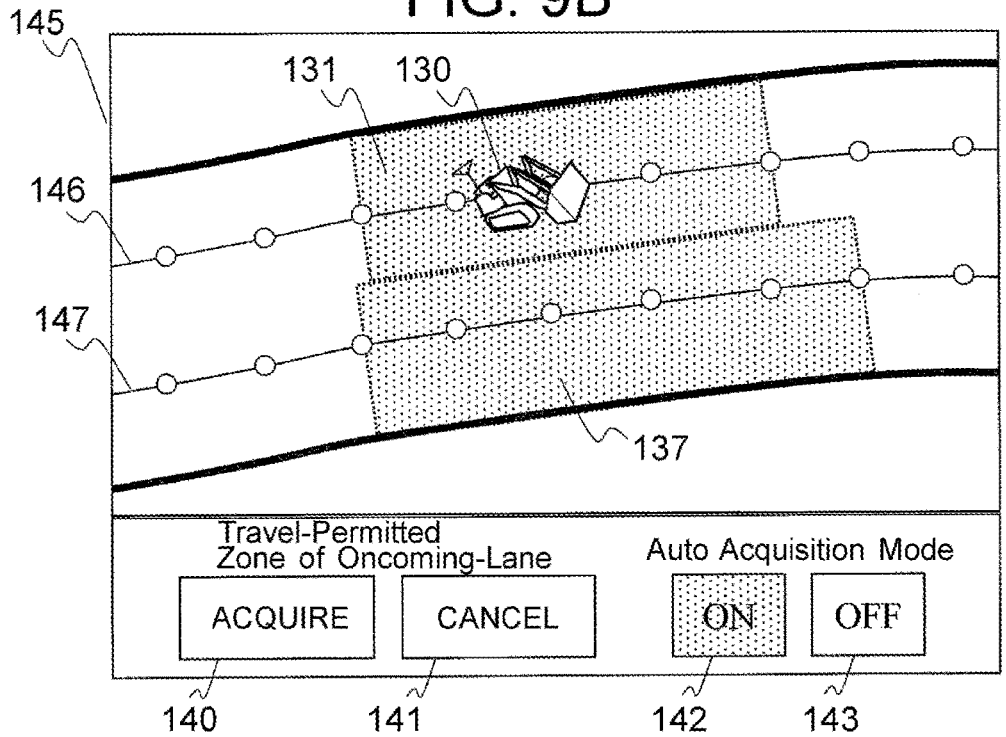

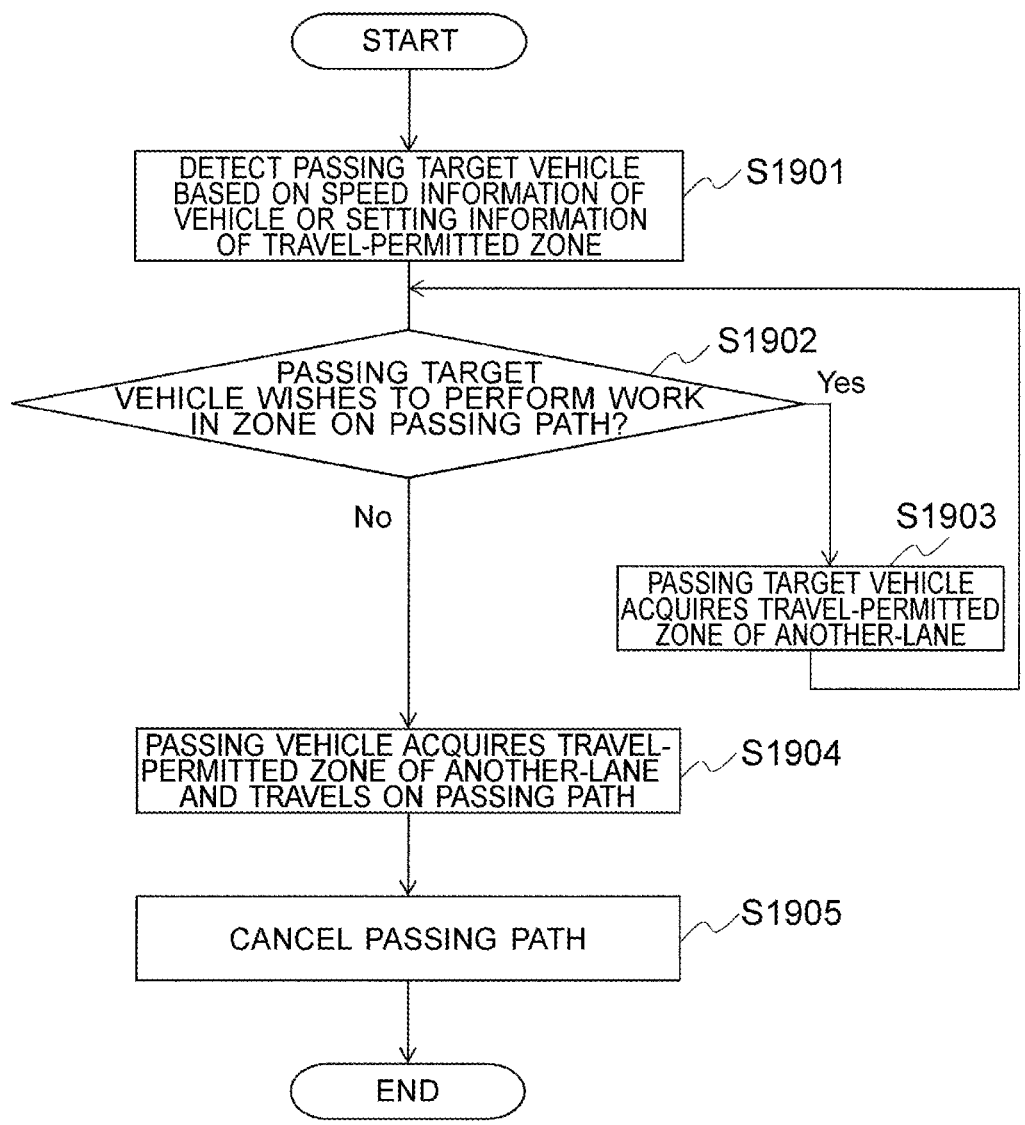

TRAFFIC CONTROL SYSTEM, TRAFFIC CONTROL DEVICE, AND ON-BOARD TERMINAL DEVICE

TECHNICAL FIELD

This invention relates to traffic control system, a traffic control device, and an on-board terminal device, and is concerned with a traffic control technology for a working site where autonomous traveling vehicles and manned vehicles travel together.

BACKGROUND ART

As a traffic control technology in an autonomous traveling system for amine, Patent Document 1 discloses: "On the basis of a monitored result of the travel conditions of the travel track, a no-entry area is established ahead of a vehicle traveling on one lane of a 2-way dual-lane vehicle track. Then travel instructions are issued to the vehicle, the travel instructions causing it to avoid the no-entry area and travel on a section of an oncoming lane, a lane whose traffic runs in the opposite direction to the one lane. Travel instructions are issued to an oncoming vehicle traveling on the oncoming lane which prohibits entry to the section. In addition, an upper limit velocity is set on the section. Then, travel conditions, including the upper limit velocity set for the section, are issued as the travel instructions to the vehicle. When the travel instructions are issued to the vehicle, the vehicle travels on the section at a velocity which does not exceed the upper limit velocity. (extracted from the Abstract)".

PRIOR ART DOCUMENT

Patent Document

Patent Document 1: U.S. Pat. No. 6,480,769 A

DISCLOSURE OF THE INVENTION

Problem to be Solved by the Invention

In a mine, manned vehicles—which travel according to driving by operators or drivers, such as bulldozers and graders for the maintenance of roads, sprinkler trucks, and light vehicles for the transportation of workers in the mine—travel together with autonomously traveling mine haulage vehicles. As a mine haulage vehicle has a greater body than a manned vehicle, the operator of the manned vehicle may have an oppressive feeling when the manned vehicle is passed by the mine haulage vehicle or passes the mine haulage vehicle as an oncoming vehicle.

According to the method of Patent Document 1, a mine haulage vehicle on the oncoming lane can be stopped when a manned vehicle passes a preceding vehicle. When a manned vehicle is traveling side by side with a mine haulage vehicle in the same direction or is passing a mine haulage vehicle traveling on an oncoming lane, however, the problem that the oppressive feeling of the operator of the manned vehicle cannot be alleviated still remains unsolved.

The present invention has been made to resolve the above-described problem, and has as objects thereof the provision of a traffic control system, a traffic control device and an on-board terminal device for allowing a manned vehicle to avoid coming close to a traveling, autonomous traveling vehicle when the autonomous traveling vehicle and the manned vehicle are allowed to travel together.

Means for Solving the Problem

To achieve the above-described objects, a traffic control system according to the present invention connects a manned vehicle, which is traveling according to operation by an operator on one of plural lanes arranged side by side in a mine, and a traffic control device, which performs traffic control of the manned vehicle, together via a wireless communication network; the traffic control device includes a travel-permitted zone setting section that sets a zone of the lane, on which the manned vehicle is traveling, as a first travel-permitted zone with a travel permission given to the manned vehicle only, an another-lane travel permitting section that sets, as a travel-permitted zone of another-lane with a travel permission given to the manned vehicle only, a zone located on a lane adjacent to the lane, on which the manned vehicle is traveling, and including at least a part of a zone running side by side with the first travel-permitted zone, and a control-center-side communication control section that transmits, to the manned vehicle, information indicating positions of the travel-permitted zone and the travel-permitted zone of another-lane; and the manned vehicle includes a command input accepting section that accepts operation which makes a setting request for the travel-permitted zone of another-lane on the lane adjacent the lane on which the manned vehicle is traveling, a display control section that displays the travel-permitted zone of another-lane on a screen, and a terminal-side communication control section that to and from the traffic control device, transmits the setting request and receives the information indicating the position of the travel-permitted zone of another-lane, respectively.

A traffic control device according to the present invention performs traffic control of a manned vehicle traveling according to operation by an operator on one of plural lanes arranged side by side in a mine; and includes a travel-permitted zone setting section that sets a zone of the lane, on which the manned vehicle is traveling, as a first travel-permitted zone with a travel permission given to the manned vehicle only, an another-lane travel permitting section that sets, as a travel-permitted zone of another-lane with a travel permission given to the manned vehicle only, a zone located on a lane adjacent the lane, on which the manned vehicle is traveling, and including at least a part of a zone running side by side with the first travel-permitted zone, and a control-center-side communication control section that transmits, to the manned vehicle, information indicating positions of the travel-permitted zone and the travel-permitted zone of another-lane.

A traffic control device according to the present invention is to be mounted in a manned vehicle that travels according to operation by an operator on one of plural lanes arranged side by side in a mine; and includes a command input accepting section that accepts operation which makes a setting request for a travel-permitted zone of another-lane, with a travel permission being given to only an own vehicle with the on-board terminal device mounted therein, on a lane adjacent the lane on which the own vehicle is traveling, a display control section that displays a position of the travel-permitted zone of another-lane when a traffic control device has set the travel-permitted zone of another-lane, and a terminal-side communication control section that to and from the traffic control device which performs traffic control for the manned vehicle, transmits the setting request and receives information indicating the position of the travel-permitted zone of another-lane, respectively.

Advantageous Effects of the Invention

According to the present invention, the manned vehicle can avoid coming close to the traveling, autonomous traveling vehicle when the manned vehicle and the autonomous traveling vehicle are allowed to travel together. Problems, configurations and advantageous effects other than those described above will become apparent from the following description of embodiments.

BRIEF DESCRIPTION OF THE DRAWINGS

FIGS. 2A to 2C are hardware configuration diagrams of a control server, a dump truck and a manned vehicle, in which FIG. 2A is a hardware configuration diagram of the control server, FIG. 2B is a hardware configuration diagram of the dump truck, and FIG. 2C is a hardware configuration diagram of the manned vehicle.

FIGS. 5A and 5B are functional block diagrams depicting principal functions on the side of the vehicles, in which FIG. 5A is a functional block diagram depicting functions of a dump truck 20, and FIG. 5B is a functional block diagram depicting functions of the manned vehicle 90.

FIGS. 7A to 7C are diagrams depicting communication operation between the dump truck and the control server at the time of initiation of autonomous traveling, in which FIG. 7A depicts a state of transmission of a message of request for setting destination from the dump truck, FIG. 7B depicts a state of response from the control server, and FIG. 7C depicts a state of request and response for permission of a travel-permitted zone.

FIGS. 8A to 8C are diagrams depicting the details of setting of travel-permitted zones, in which FIG. 8A depicts a state of transmission of request messages for travel-permitted zones from the dump truck and the manned vehicle, FIG. 8B depicts a response message from the control server, and FIG. 8C depicts a state of request and response for permission of a travel-permitted zone.

FIGS. 9A and 9B are examples of screens displayed on a display device of a navigation system installed in a bulldozer (manned vehicle), in which FIG. 9A is a view showing a screen before the manned vehicle acquires a zone on an oncoming lane as a travel-permitted zone, and FIG. 9B is a view showing a screen after the manned vehicle has acquired the zone on the oncoming lane as the travel-permitted zone.

FIGS. 10A and 10B are examples of screens displayed on the display device of the navigation system installed in the bulldozer (manned vehicle), in which FIG. 10A is a view showing a screen after the bulldozer has acquired a zone over adjacent two lanes as a travel-permitted zone, and FIG. 10B is a view showing a screen in a state that the bulldozer has finished work and returned to the own lane but the direction of its body is opposite to the traveling direction.

FIGS. 11A and 11B are examples of screens displayed on the display device of the navigation system installed in the bulldozer (manned vehicle), in which FIG. 11A is a view of a screen showing a state that the operator of the manned vehicle has manually designated two points desired to acquire a travel-permitted zone of the oncoming lane, and FIG. 11B is a view showing a screen after boundary points of the zone desired to be acquired have been searched and the manned vehicle has acquired the zone on the oncoming lane as a travel-permitted zone.

FIGS. 18A to 18C are schematic diagrams describing a passing path and a travel-permitted zone in passing operation, in which FIG. 18A is a diagram depicting a passing vehicle and a passing target vehicle before initiation of the passing operation, and a positional relationship between travel-permitted zones for the respective vehicles, FIG. 18B is a diagram describing the outline of generation of the passing path, and FIG. 18C is a diagram describing the outlines of the travel-permitted zones to be set upon the passing operation.

FIG. 19 is a flow chart describing the outline of the passing operation.

MODES FOR CARRYING OUT THE INVENTION

In the following embodiments, a description will be made by dividing them into plural sections or embodiments wherever needed for the sake of convenience. When the numbers of elements and the like (including the numbers of parts or components, numerical values, amounts, ranges, and so on) are referred to in the following embodiments, they shall not be limited to any specific numbers and may be greater or smaller than such specific numbers unless specifically indicated or unless apparently limited to such specific numbers in principle. In the following embodiments, their constituent elements (including processing steps and the like) are not absolutely essential unless specifically indicated or unless clearly considered to be essential in principle. Further, the individual configurations, functions, processing sections, processing means (devices) and the like in the following embodiments may be partly or wholly realized (configured), for example, as integrated circuits or other hardware. Alternatively, the below-described individual configurations, functions, processing sections, processing means and the like may be realized (configured) as programs to be executed on a computer, in other words, may be realized as software. In such alternative modifications, CPU which is executing the software configures individual sections (which may also be called "individual components" or "individual devices"). Without being limited to CPU, the individual sections may also be configured as an integrated circuit that realizes the individual functions. Further, each section may be configured of a single control device, or may be configured of plural control devices connected together. When configured as plural control devices, the individual control devices do not need to be incorporated in the same housing, and may be in a configuration that the individual control devices are incorporated in separate housings and are connected together always or when need irrespective of wired or wireless communication. Information on programs, tables, files and the like, which realize the individual configurations, functions, processing sections, processing means and the like, can be stored in storage devices such as memories, hard disks or solid state drives (SSDs) or the like or storage media such as IC cards, SD cards or DVDs.

The embodiments of the present invention will hereinafter be described in detail based on the drawings. Throughout the drawings that describe or illustrate the embodiments, members having the same functions are identified by the same or related reference signs, and their repeated descriptions will be omitted. It is also to be noted that in the following embodiments, the description of the same or similar parts will not be repeated as a general rule unless specifically needed.

Figure 1:
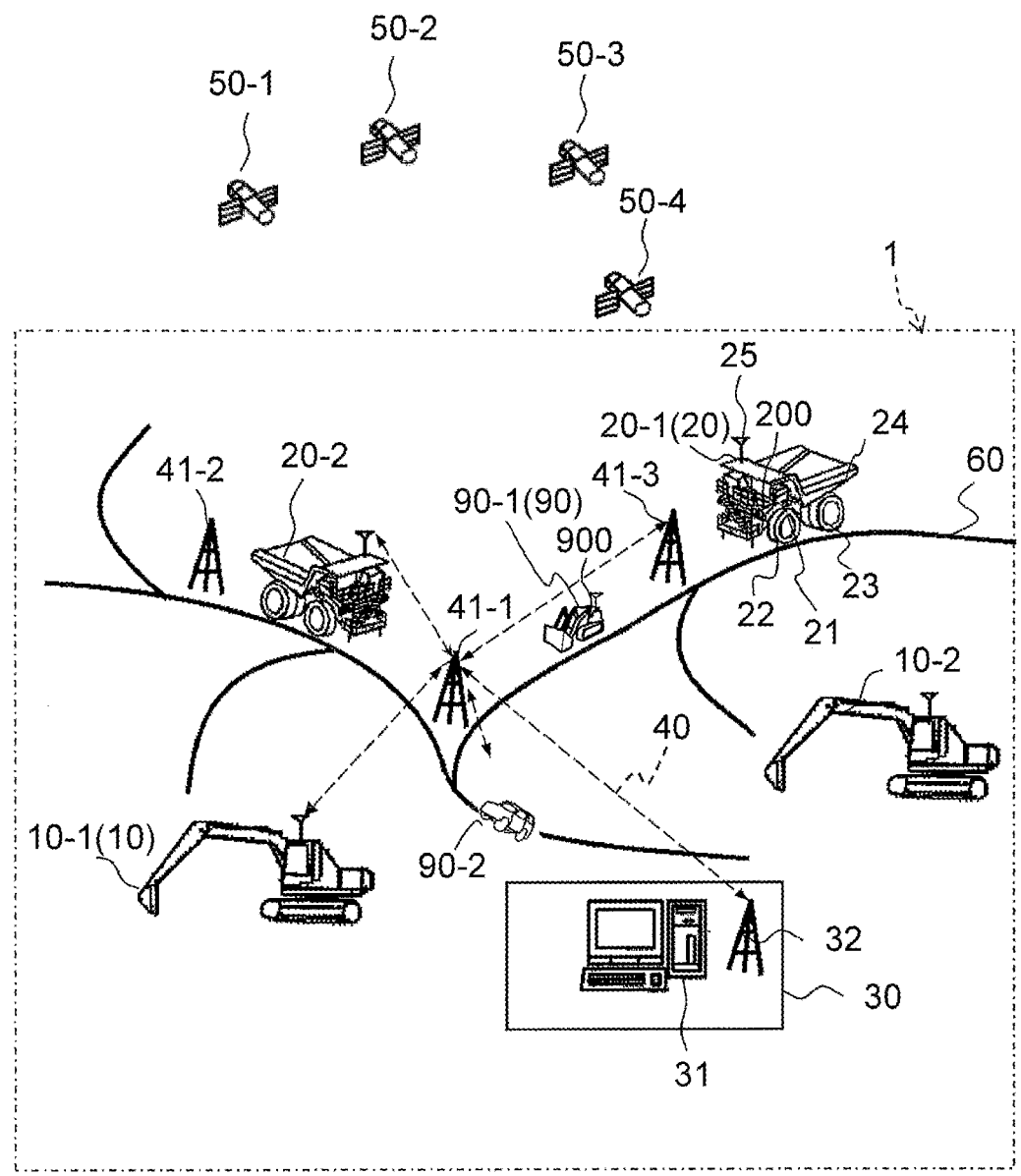
FIG. 1 is a view illustrating the schematic configurations of a traffic control system.

Based on FIG. 1, a description will first be made about the schematic configurations of the traffic control system including the control server according to the present invention. FIG. 1 is a view illustrating the schematic configurations of the traffic control system.

The traffic control system 1 illustrated in FIG. 1 is configured by connecting autonomous traveling vehicles 20-1,20-2 for mines, a control server 31 and manned vehicles 90-1,90-2 together for communications via a wireless communication network 40. The autonomous traveling vehicles 20-1,20-2 serve to haul payloads such as rock, ore and/or the like loaded from excavators 10-1,10-2 that perform digging and loading work at a quarry such as a mine. The control server 31 is installed at a control center 30 located near or remote from the quarry. The manned vehicles 90-1,90-2 are used to perform leveling of haul roads on which the autonomous traveling vehicles 20-1,20-2 travel, and also to transport workers. Dump trucks are used as autonomous traveling haul vehicles, so that the autonomous traveling haul vehicles will hereinafter be called "dump trucks". The control server 31 is a traffic control device that performs traffic control of the dump trucks and manned vehicles.

The individual dump trucks 20-1,20-2 travel back and forth between the excavator 10-1 or 10-2 and an unillustrated dumping site along a haul road 60 set beforehand in the mine, and haul payloads.

In the mine, plural wireless base stations 41-1,41-2,41-3 are arranged. Via these wireless base stations 41-1,41-2,41-3, wireless communication radio waves are transmitted and received.

The excavators 10-1,10-2, individual dump trucks 20-1,20-2 and manned vehicles 90-1,90-2 are each provided with a position calculating device (illustration omitted in FIG. 1), which receives positioning radio waves from at least four positioning satellites 50-1,50-2,50-3,50-4 of a global positioning system (GPS) to acquire the position of the own vehicle. The dump trucks 20-1,20-2 have the same configuration, and therefore will hereinafter be referred to as "the dump truck 20" when they are collectively called without distinction. Further, the excavators 10-1,10-2 also have the same configuration, and therefore will hereinafter be referred to as "the excavator 10" when they are collectively called without distinction. Furthermore, the manned vehicles 90-1,90-2 also have the same configuration, and therefore will hereinafter be referred to as "the manned vehicle 90" when they are collectively called without distinction.

The dump truck 20 includes a vehicle frame 21 forming a main body, front wheels 22 and rear wheels 23, a vessel 24 pivotal in an up-and-down direction about hinge pins (not shown) provided on a rear section of the vehicle frame 21, and a pair of left and right hoist cylinders (not shown) for pivoting the vessel 24 in the up-and-down direction. The dump truck 20 also includes an antenna 25 disposed at a location of good visibility, for example, on a front part of its top surface for connection with the wireless communication network 40.

In addition, the dump truck 20 also includes a travel control device 200 mounted therein for autonomously traveling according to instructions from the control server 31.

The manned vehicle 90 is a vehicle that travels according to operation by the operator. In the manned vehicle 90, a navigation system 900 (on-board terminal device) is mounted for allowing the operator to perform operation in accordance with instructions from the control server 31.

The control server 31 is connected to an antenna 32 for connection to the wireless communication network 40. The control server 31 communicates with the dump truck 20 and manned vehicle 90 via the antenna 32 and wireless base stations 41-1,41-2,41-3.

Figure 2A:
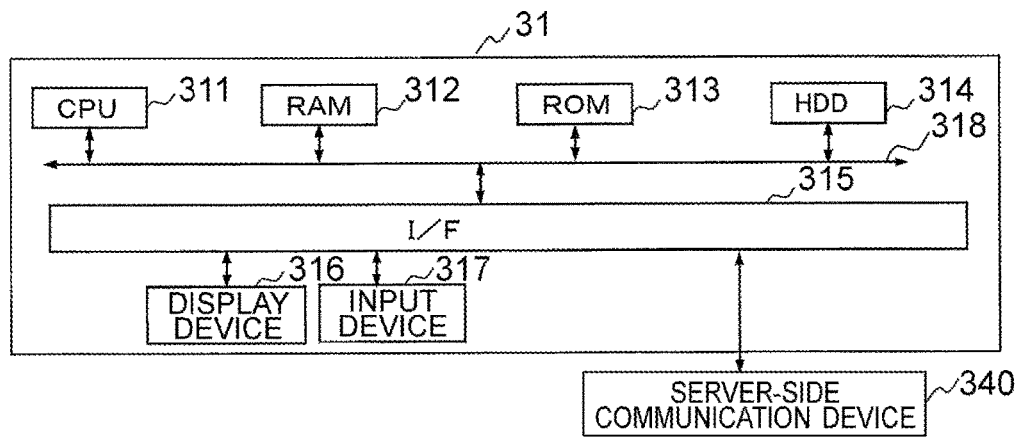
Figure 2B:
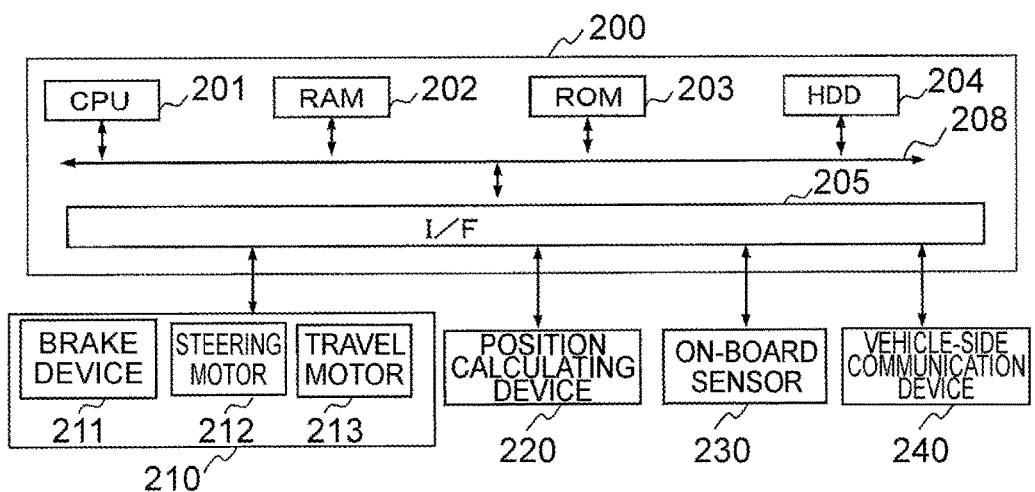
Figure 2C:
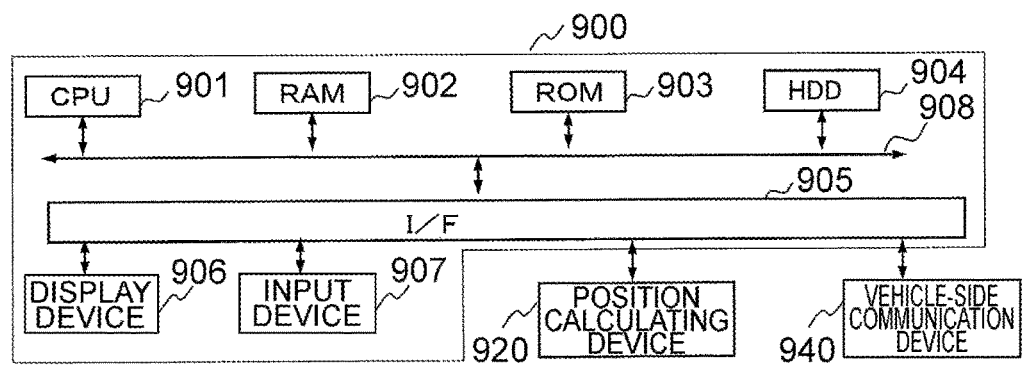
Figure 3:
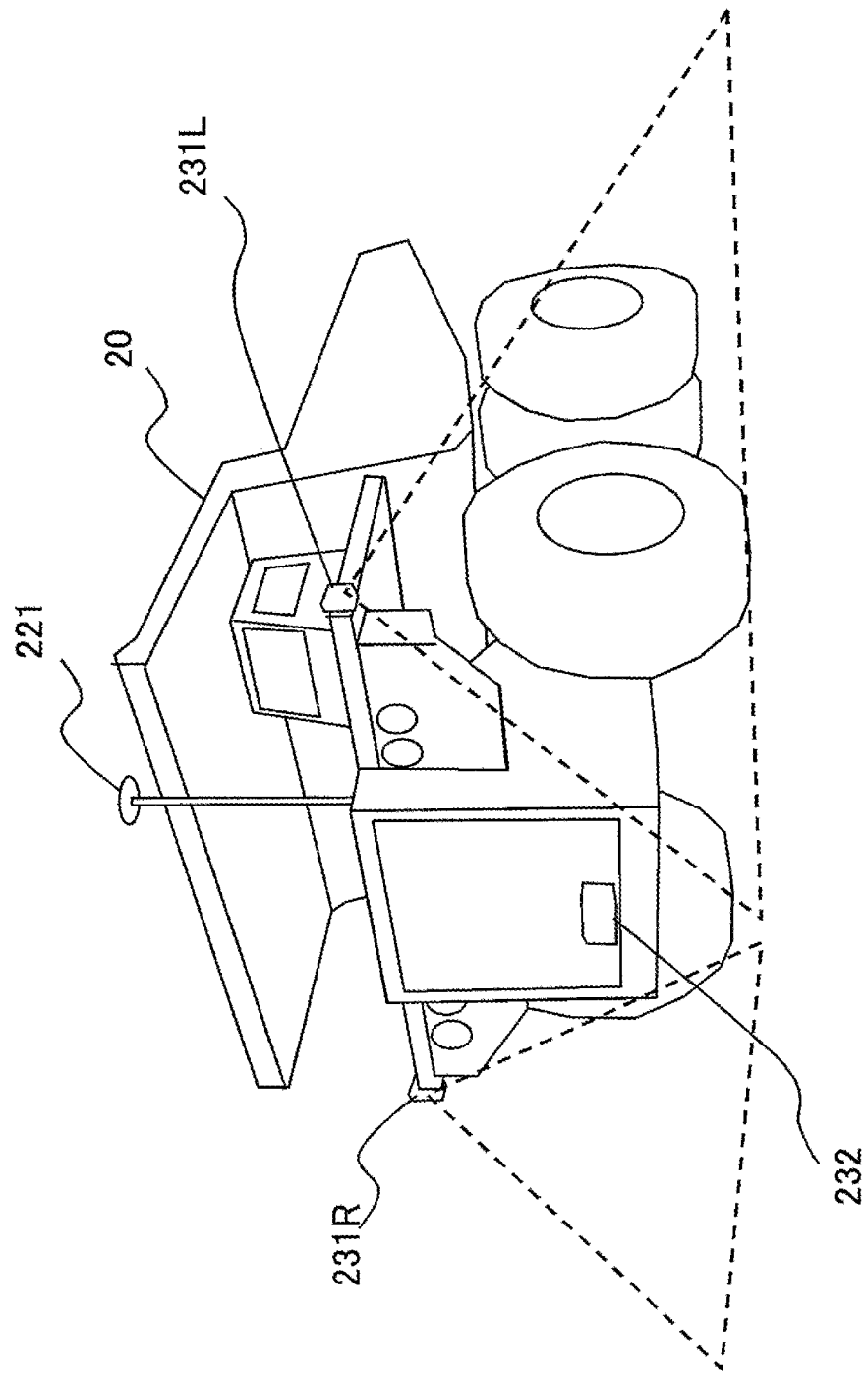
FIG. 3 is a view illustrating an external appearance of the dump truck.

Referring next to FIG. 2A to FIG. 3, a description will be made about the hardware configurations of the control server 31, dump truck 20 and manned vehicle 90 of FIG. 1. FIGS. 2A to 2C are the hardware configuration diagrams of the control server 31, dump truck 20 and manned vehicle 90, in which FIG. 2A depicts the hardware configuration diagram of the control server, FIG. 2B depicts the hardware configuration diagram of the dump truck, and FIG. 2C depicts the hardware configuration diagram of the manned vehicle. FIG. 3 is a view illustrating an external appearance of the dump truck 20.

As depicted in FIG. 2A, the control server 31 includes a CPU 311, a random access memory (RAM) 312, a read only memory (ROM) 313, a hard disk drive (HDD) 314, an I/F 315, and a bus 318. These CPU 311, RAM 312, ROM 313, HDD 314 and I/F 315 are connected together via the bus 318 to configure the control server 31.

The control server 31 is also provided with a display device 316 and an input device 317, which are connected to the I/F 315.

The CPU 311 is a computing unit, and controls operation of the entire control server 31.

The RAM 312 is a volatile storage medium that permits high-speed reading and writing of information, and is used as a working area when the CPU 311 processes information.

The ROM 313 is a read-only, non-volatile recording medium, in which an autonomous travel control program is stored.

The HDD 314 is a non-volatile recording medium that permits reading and writing of information, in which an operating system (OS), various control programs and application program, and the like are stored.

The display device 316 is a user interface for allowing a user to perform the confirmation of traveling conditions of each dump truck in the mine, and is configured, for example, of a liquid crystal display (LCD).

The input device 317 is another user interface for allowing the user to input information into the control server 31, and is configured, for example, using a mouse, a keyboard and/or a touch panel stacked on the LCD, (illustration omitted).

To the I/F 315 of the control server 31, a server-side communication device 340 is connected for connection to the wireless communication network 40.

On the other hand, the dump truck 20 is provided, as depicted in FIG. 2B, with the travel control device 200 that performs control processing for autonomous traveling, a travel drive devices 210 for driving the dump truck 20 to allow it to travel according to control instructions from the travel control device 200, a position calculating device 220 for calculating the position of the dump truck 20, that is, the own vehicle, anon-board sensor 230, such as a millimeter-wave sensor, for recognizing surrounding environments of the dump truck 20, and a vehicle-side communication device 240 for connection to the wireless communication network 40.

The travel drive devices 210 include a brake device 211 for applying a brake to the dump truck 20, a steering motor 212 for changing the steering angle of the dump truck 20, and a travel motor 213 for allowing the dump truck 20 to travel.

The position calculating device 220 is a device that specifies the own position. Because of the use of the GPS, which calculates the position of the own vehicle by receiving positioning radio waves from the positioning satellites 50-1,50-2,50-3,50-4, in this embodiment, the dump truck 20 is provided with a GPS antenna 221 (see FIG. 3). The position calculating device 220 is not needed to be the GPS, and may rely, for example, upon an inertial measurement unit (IMU) or a system that specifies a position by using radio waves from base stations arranged on the ground. In such a modification, the dump truck 20 is provided, instead of the antenna 221 for the GPS, with an antenna for the system and a gyro sensor or a sensor that detects the rotational speed of a wheel.

The on-board sensor 230 serves to recognize or estimate the speed of the dump truck 20 and the peripheral environments. For example, a device that makes up an element of a shoulder detection section or performs detection of a front obstacle corresponds to the on-board sensor 230. As the shoulder detection section, laser radar sensors 231L,231R (see FIG. 3) are provided in this embodiment. However, the shoulder detection section is not limited to them, and may be one that uses cameras and detects a shoulder by image processing. In this modification, the laser radar sensors 231L, 231R are replaced by cameras arranged to look down at areas laterally outboard of the body. As the detection device for the front obstacle, a millimeter-wave radar sensor 232 is provided in this embodiment, and using its output, the obstacle existing ahead of the dump truck 20 in its traveling direction is detected. Instead of the millimeter-wave radar sensor 232, plural cameras which are directed forward may be arranged. In this modification, the mounting positions of the plural cameras may be set still above the position of the millimeter-wave radar sensor 232 illustrated in FIG. 3 so that the cameras look down at front areas.

A detection result by the on-board sensor 230 is outputted to the travel control device 200, and is normally used for the monitoring of the traveling position to avoid any departure from the traveling path and also for an acceleration or deceleration and in the event of an emergency, is used for braking operation required for an emergency evasive action.

The travel control device 200 includes a CPU 201, an RAM 202, an ROM 203, an HDD 204, an I/F 205, and a bus 208. These CPU 201, RAM 202, ROM 203, HDD 204 and I/F 205 are connected together via the bus 208 to configure the travel control device 200. Further, the travel drive devices 210, position calculating device 220, on-board sensor 230 and vehicle-side communication device 240 are connected to the I/F 205.

As depicted in FIG. 2C, the manned vehicle 90 is also provided with the navigation system 900 for receiving instructions from the control server 31 and notifying it to the operator who is driving the vehicle, a position calculating device 920 for calculating the vehicle position of the manned vehicle 90, and a vehicle-side communication device 940 for connection to the wireless communication network 40.

The navigation system 900 includes a CPU 901, an RAM 902, an ROM 903, an HDD 904, an I/F 905, a bus 908, a display device 906, and an input device 907. The display device 906 serves to display information, which the navigation system 900 has acquired, to the operator. The input device 907 serves as a user interface when the operator inputs an operational command into the navigation system 900. These CPU 901, RAM 902, ROM 903, HDD 904 and I/F 905 are connected together via the bus 908, and the display device 906 and input device 907 are connected to the I/F 905, whereby the navigation system 900 is configured. The position calculating device 920 and vehicle-side communication device 940 are also connected to the I/F 905.

Figure 4:
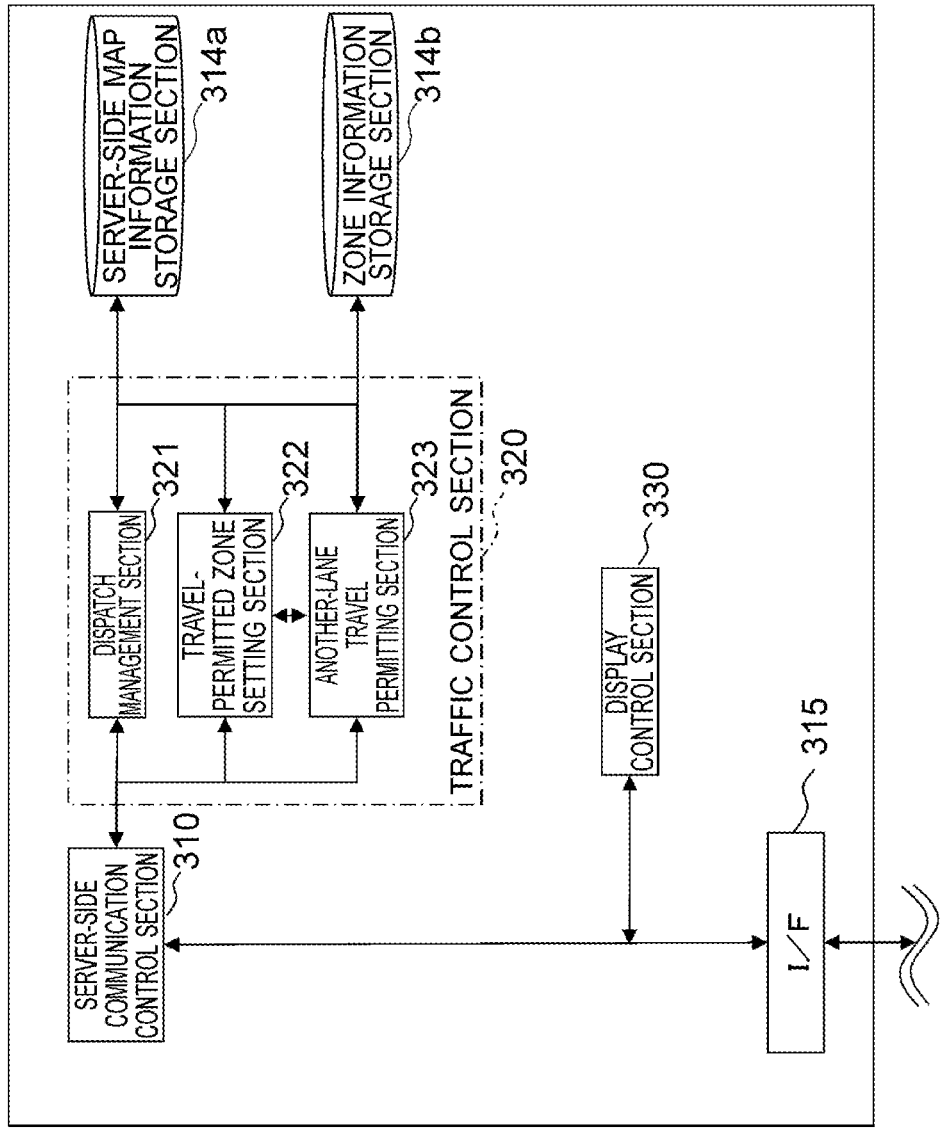
FIG. 4 is a functional block diagram depicting principal functions of the control server.
Figure 5A:
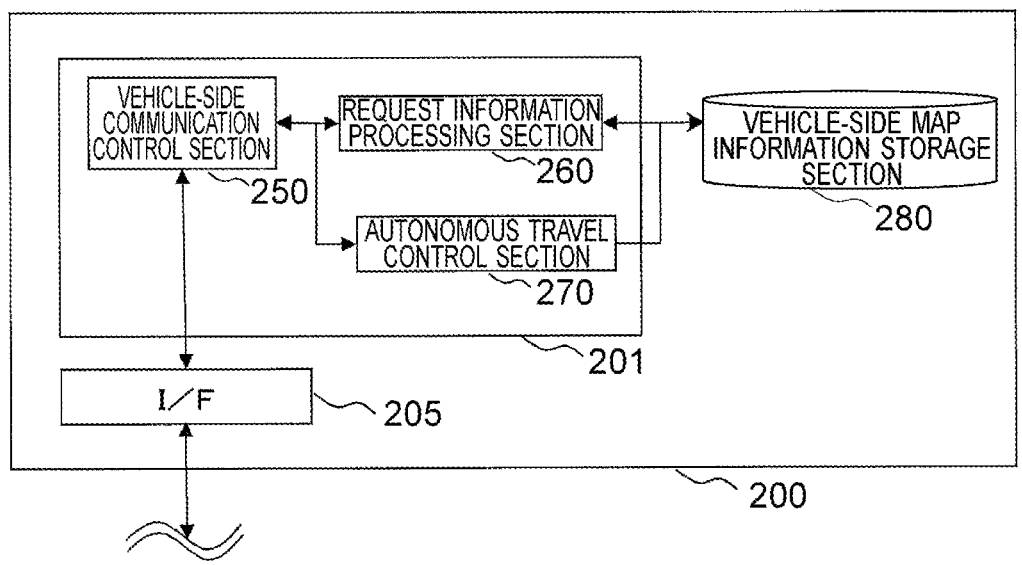
Figure 5B:
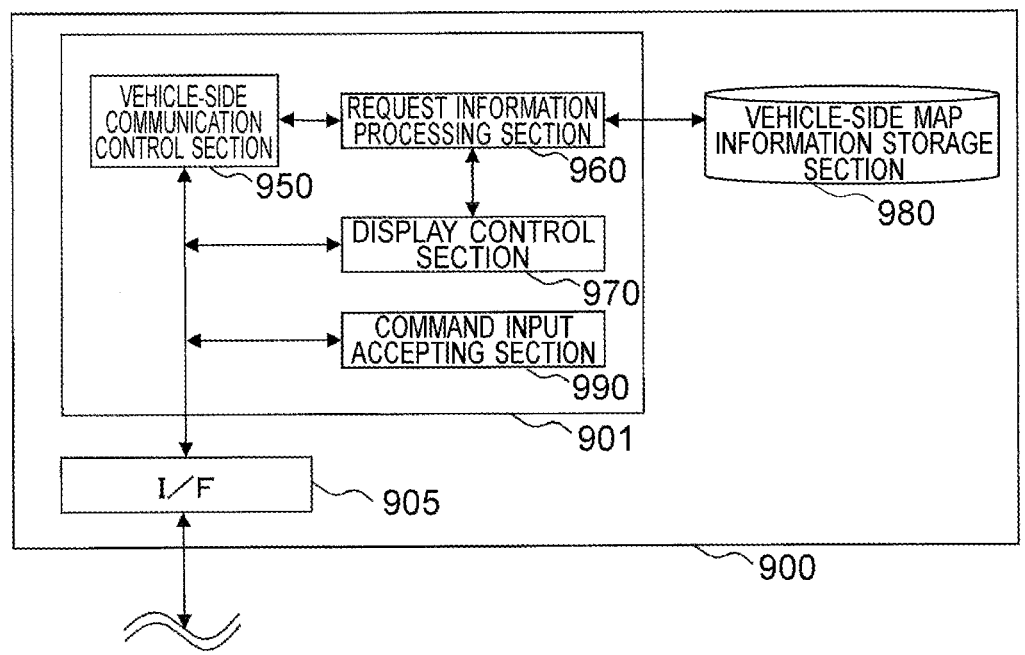

Referring next to FIG. 4 to FIG. 5B, a description will be made about functional configurations of the control server 31, dump truck 20 and manned vehicle 90. FIG. 4 is a functional block diagram depicting principal functions of the control server. FIGS. 5A and 5B are functional block diagrams depicting principal functions on the side of the vehicles, in which FIG. 5A is a functional block diagram depicting functions of the dump truck 20, and FIG. 5B is a functional block diagram depicting functions of the manned vehicle 90.

As depicted in FIG. 4, the control server 31 is provided with a server-side communication control section ("server-side" is corresponds to "controller-side" in claims) 310, a traffic control section 320, a server-side map information storage section 314a, and a zone information storage section 314b. The server-side communication control section 310 performs control to conduct wireless communications with the dump truck 20 and manned vehicle 90. The traffic control section 320 determines a destination for the dump truck 20 and a travel path to the destination, and performs traffic control to avoid interference between dump trucks themselves or between the dump truck and the manned vehicle. The server-side map information storage section 314a stores map information of a haul road, on which the dump truck 20 and the manned vehicle 90 travel. The zone information storage section 314b stores positional information of travel-permitted zones, which have been set, and travel-permitted zone of another-lanes to be described subsequently herein. The haul road is a road that connects a starting point and an end point of the dump truck 20, such as a loading site and a dumping site, or an unillustrated parking area, and plural lanes are arranged on this road. If one lane in each direction, two lanes in total are formed, the adjacent lane is the oncoming lane. Concerning a road having two or more lanes in each direction, an adjacent lane may be a passing lane in some instances.

The server-side communication control section 310 is connected to the server-side communication device 340 via the I/F 315, and performs control to conduct actual wireless communication between the dump truck 20 and the manned vehicle 90.

The traffic control section 320 includes a dispatch management section 321, a travel-permitted zone setting section 322, and an another-lane travel permitting section 323.

The dispatch management section 321 sets a destination for the dump truck 20, and determines a travel path from the current position to the destination with reference to the map information stored in the server-side map information storage section 314*a*.

As an example of processing by the dispatch management section 321, if the dump truck 20 is in the parking area, for example, an entrance of the loading site including a loading position is set as a destination. The dispatch management section 321 then sets a travel lane from the parking area to the entrance of the loading site. Upon setting this travel lane, the dispatch management section 321 may dynamically generate a travel path (dynamic path) following each movement of the loading position. If the dump truck 20 is at the loading position, on the other hand, the dispatch management section 321 sets either the dumping site 62 or the dump site 63 as a destination depending on the contents of its payload, and generates a dynamic path to the destination. Further, to set a travel path for the manned vehicle 90, the operator on the manned vehicle 90 may input the destination by using the navigation system 900, may transmit the inputted destination to the control server 31 via the vehicle-side communication device 240 and server-side communication device 340, or may set a path, which extends from the current position of the manned vehicle 90 to the inputted destination, as a travel lane by the dispatch management section 321 of the control server 31.

The travel-permitted zone setting section 322 sets a zone of the travel lane of the manned vehicle 90 as a first travel-permitted zone with a travel permission given to the manned vehicle 90 only. The travel-permitted zone setting section 322 also sets a zone on the travel lane of the dump truck 20 as a second travel-permitted zone with a travel permission given to the dump truck 20 only. The travel-permitted zone setting section 322 updates the zone information, which has been stored in the zone information storage section 314*b*, by overwriting it with the positional information of the first and second travel-permitted zones. Included in the zone information are the node ID of a front boundary point as a node at the frontmost end of each travel-permitted zone, and the node ID of a rear boundary point as a node at the backward boundary end of the travel-permitted zone. Upon reception of information that requests the setting of a new travel-permitted zone (hereinafter called the "message of request for permission of a travel-permitted zone") from the dump truck 20 or manned vehicle 90, the travel-permitted zone setting section 322 performs, responsive to the reception, setting processing for the new travel-permitted zone. When the new travel-permitted zone has been set, the travel-permitted zone setting section 322 generates information indicating the travel-permitted zone (hereinafter called the "message of response for permission of a travel-permitted zone"). If failed, on the other hand, the travel-permitted zone setting section 322 generates a non-permission response message indicating non-permission of travel.

Upon setting the first travel-permitted zone and second travel-permitted zone, the travel-permitted zone setting section 322 refers to the zone information. The first travel-permitted zone or second travel-permitted zone for the vehicle, which has transmitted a message of request for permission of a travel-permitted zone, is set so that it do not overlap the first travel-permitted zone or second travel-permitted zone set for another vehicle or a travel-permitted zone of another-lane to be described subsequently herein. As a consequence, plural vehicles do not enter the same first travel-permitted zone or second travel-permitted zone, so that vehicles can avoid interfering with each other.

The another-lane travel permitting section 323 sets, as a travel-permitted zone of another-lane with a travel permission given to the manned vehicle 90 only, a zone located on a lane adjacent the lane, on which the manned vehicle 90 is traveling, and including at least a part of a zone arranged side by side with the first travel-permitted zone, and overwrites the zone information with the travel-permitted zone of another-lane. The travel-permitted zone of another-lane may be a zone that is located on the adjacent lane and includes a zone arranged side by side with the first travel-permitted zone (a zone longer in a front-and-rear direction than the first travel-permitted zone).

Upon setting the travel-permitted zone of another-lane, if the travel-permitted another-lane does not overlap the first travel-permitted zone and second travel-permitted zone set for the another vehicle traveling on the lane adjacent the lane on which the manned vehicle is traveling, the adjacent lane being a target lane for the setting of the travel-permitted another-lane, in other words, if the another vehicle on the adjacent lane is at a stop, the another-lane travel permitting section 323 sets the travel-permitted zone of another-lane over the first travel-permitted zone or second travel-permitted zone set for the another vehicle. As a consequence, the manned vehicle can pass an oncoming vehicle on the adjacent lane after causing the oncoming vehicle to stop, or can pass a vehicle on the adjacent lane after causing the vehicle to stop (including a case that the manned vehicle is traveling on its own travel lane and passes a vehicle on the adjacent lane).

In an automated acquisition mode for a travel-permitted zone of another-lane (the details of which will be described subsequently herein), following the setting of a new first travel-permitted zone for the manned vehicle 90 by the travel-permitted zone setting section 322, the another-lane travel permitting section 323 sets a new travel-permitted zone of another-lane in a zone arranged side by side with the new first travel-permitted lane.

A display control section 330 performs control to display, on the screen of the display device 316, the positions of the dump truck 20 and manned vehicle 90 traveling on the haul road 60 and own setting conditions for the first travel-permitted zone, second travel-permitted zone and travel-permitted zone of another-lane.

The server-side map information storage section 314*a* stores map information of the haul road 60.

The zone information storage section 314*b* stores zone information indicating the positions of the first travel-permitted zone, second travel-permitted zone and travel-permitted zone of another-lane under setting.

As depicted in FIG. 5A, the travel control device 200 to be mounted on the dump truck 20 is provided with a vehicle-side communication control section (which corresponds to the vehicle-side communication control section) 250, a request information processing section 260, an autonomous travel control section 270, and a vehicle-side map information storage section 280.

The vehicle-side communication control section 250 performs control of wireless communications to be performed with the control server 31. The vehicle-side communication control section 250 performs the transmission of the message of request for permission of a travel-permitted zone and the reception of a message of response for permission of a travel-permitted zone or a non-permission response message.

The request information processing section 260 determines, on the basis of the map information stored in the vehicle-side map information storage section 280 and the own vehicle position calculated by the position calculating device 220 (see FIG. 2B), whether the dump truck 20 has reached a point where the dump truck 20 transmits the message of request for permission of a travel-permitted zone upon arrival at a request point. If determined to have reached the request point, the request information processing section 260 generates the message of request for permission of a travel-permitted zone and transmits it to the control server 31 via the vehicle-side communication control section 250.

The autonomous travel control section 270 acquires the own vehicle position from the position calculating device 220, and with reference to the map information in the vehicle-side map information storage section 280, performs control on the travel drive devices 210 (see FIG. 2B) to allow the own vehicle to travel according to the travel-permitted zone contained in the message of response for permission of a travel-permitted zone. Further, the autonomous travel control section 270 determines the existence or non-existence of a front obstacle on the basis of a detection result by the on-board sensor 230, determines the need or no need for an evasive operation for interference or collision with the obstacle, and if necessary, performs control for braking operation. Furthermore, according to instructions from the control server 31, the autonomous travel control section 270 also conducts drive control for the brake device 211 to perform deceleration operation, normal stop operation, or emergency stop operation.

As depicted in FIG. 5B, the navigation system 900 to be mounted in the manned vehicle 90 is provided with a vehicle-side communication control section 950, a request information processing section 960, a display control section 970, a command input accepting section 990, and a vehicle-side map information storage section 980. The vehicle-side communication control section 950, request information processing section 960 and vehicle-side map information storage section 980 have the same functions as those which the dump truck 20 is provided with, and therefore their description is omitted.

The command input accepting section 990 accepts such operation that the operator on the manned vehicle 90 operates the input device 907 to designate a destination for the manned vehicle or to make a setting request for a travel-permitted zone of another-lane on another lane including the lane adjacent the travel lane on which the manned vehicle 90 is traveling. If the operator wants to perform work or the like on the another lane, the operator performs through the input device 907 operation to acquire an travel-permitted zone of another-lane, and responsive to the input operation, the command input accepting section 990 inputs a message to make a setting request for the travel-permitted zone of another-lane (hereinafter called "message of request for permission of a travel-permitted zone of another-lane").

The command input accepting section 990 also accepts operation that the operator makes a cancellation request for the travel-permitted zone of another-lane.

The display control section 970 displays an image of a haul road, on which the manned vehicle 90 travels, on the display device 906 by using the information in the vehicle-side map information storage section 980, and also displays, in superimposition on the image of the haul road, the positional information of the first travel-permitted zone and travel-permitted zone of another-lane, which the navigation system 900 has received from the control server 31, and the current position of the own vehicle, which the position calculating device 920 has calculated. While looking at the first travel-permitted zone for the own vehicle and the current position of the own vehicle as displayed on the display device 906, the operator who is driving the manned vehicle 90 performs traveling of the vehicle so that the manned vehicle 90 does not stray from the first travel-permitted zone.

Figure 6:
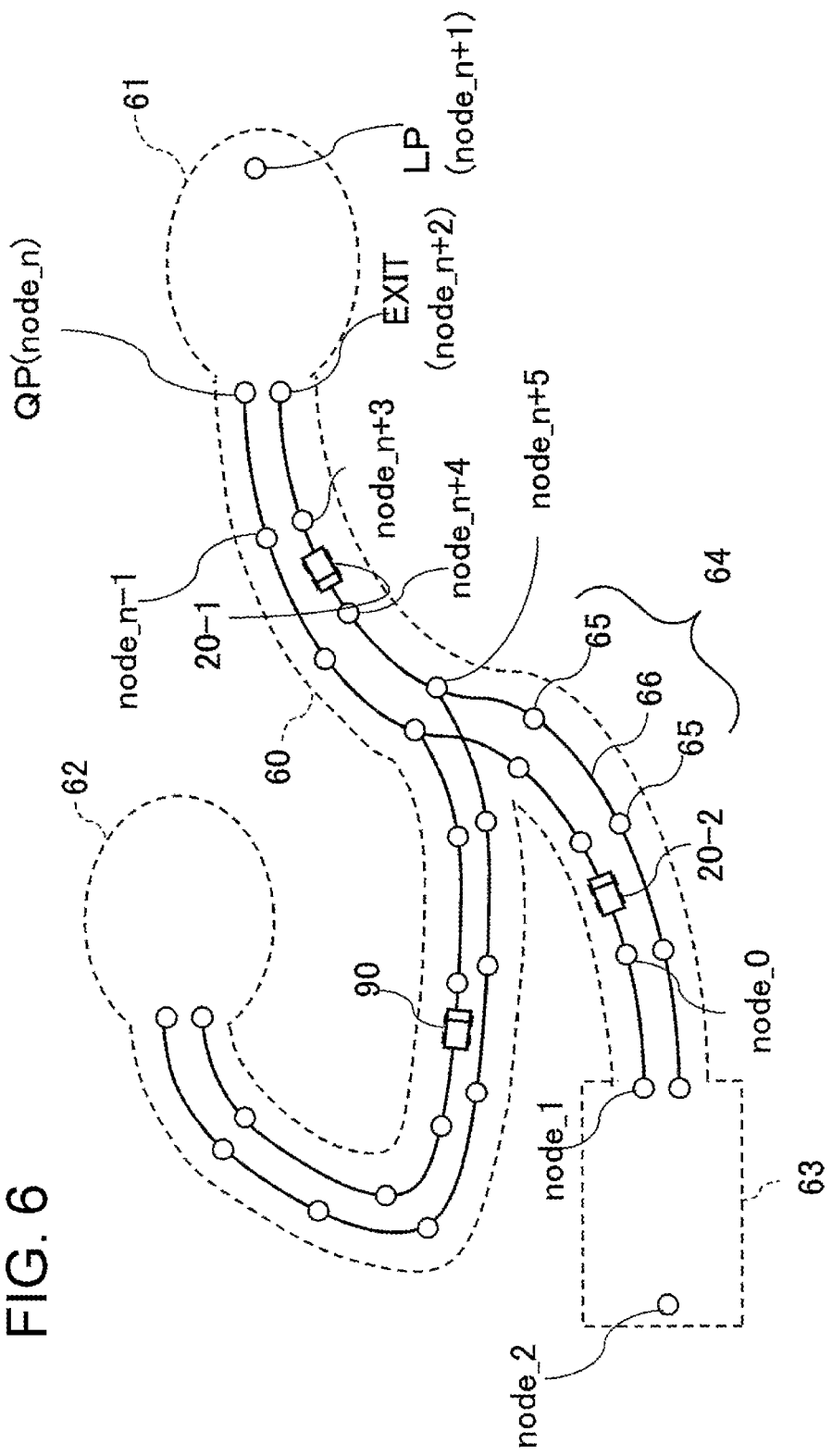
FIG. 6 is a view illustrating a configuration example of an surface mine site in which dump trucks and manned vehicles are traveling.

With reference to FIG. 6 to FIG. 8C, a description will next be made about processing with the control sever when the dump truck and manned vehicle travel. FIG. 6 is a view illustrating a configuration example of an surface mine site in which dump trucks and manned vehicles are traveling. FIGS. 7A to 7C are diagrams depicting communication operation between the dump truck and the control server at the time of initiation of autonomous traveling, in which FIG. 7A depicts a state of transmission of a message of request for setting destination from the dump truck, FIG. 7B depicts a state of response from the control server, and FIG. 7C depicts a state of request and response for permission of a travel-permitted zone. FIGS. 8A to 8C are diagrams depicting the details of setting of travel-permitted zones, in which FIG. 8A depicts a state of transmission of request messages for travel-permitted zones from the dump truck and the manned vehicle, FIG. 8B depicts a response message from the control server, and FIG. 8C depicts a state of request and response for permission of a travel-permitted zone.

Reference sign 61 shown in FIG. 6 designates an excavation site by a mining machine such as the excavator 10 and a loading site where the mining machine loads the dump truck 20. A position in the loading site 61, at which the dump truck 20 stops around the excavator 10 and loading work is performed, is called a "loading position" (which corresponds to LP in FIG. 6). Topsoil and ore excavated by the excavator 10 are loaded on the dump truck 20 at the loading site 61. Designated at reference sign 62 is a dumping site where topsoil is spread. Top soil and the like hauled in from the loading site 61 are dumped at this site and are spread in layers or radially. Reference sign 63 indicates another dumping site, where a crusher or the like is installed to crush ore. The crushed ore is transported by a belt conveyor or the like to a shipping site from which the crushed ore is shipped by freight cars, processing facilities, or the like.

Further, QP in FIG. 6 designates an entrance to the loading site 61 and also a queuing point where the dump truck 20 stops and waits until a permission of entry (CALL) to the loading position is issued from the excavator 10 to the dump truck. EXIT in FIG. 6 indicates an exit through which the dump truck 20 leaves from the loading site 61.

The dump truck 20 is loaded with topsoil or ore at the loading site 61, travels on the haul road 60, and hauls it to the dumping site 62 or 63. On the haul road 60, travel paths (lanes) 64 are arranged, and the dump truck 20 travels along one of the travel paths 64. Each travel path 64 is defined as coordinate values set on a map. The dump truck 20 autonomously travels along the one travel path 64 by controlling accelerations and decelerations and steering while comparing the own position, which is specified by the GPS or another position calculating device, with the coordinate values of the one travel path 64.

On each travel path 64, nodes 65 and links 66 are arranged. The nodes 65 indicate boundaries of segments of the travel path, while the links 66 connect the adjacent nodes to each other. Information of the existing travel paths 64, nodes 65 and links 66 are stored as unitary map information in the server-side map information storage section 314a and the vehicle-side map information storage sections 280,980. In the map information, the traveling directions of the travel paths (lanes) 64 are also stored.

The control server 31 performs, by the traffic control section 320, the issuance or cancellation of a travel permission with respect to every travel zone including the adjacent two nodes 65 and one link 66, and notifies information of the issuance or cancellation as zone information to the dump truck 20 and manned vehicle 90. Relying upon such notifications, the traveling of the dump truck and manned vehicle is controlled so that the dump truck and the manned vehicle can avoid a collision between themselves. Further, each travel path 64 is provided with a speed limit for every segment, and the dump truck 20 travels at an appropriate speed while referring to speed limit information in the vehicle-side map information storage sections 280,980, respectively.

Figure 7A:
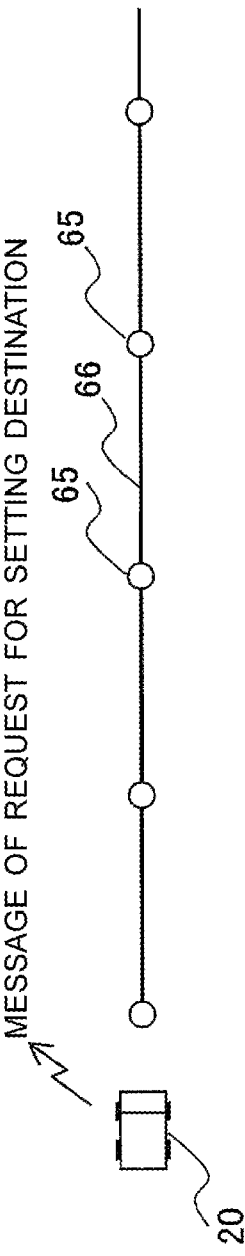
Figure 7B:
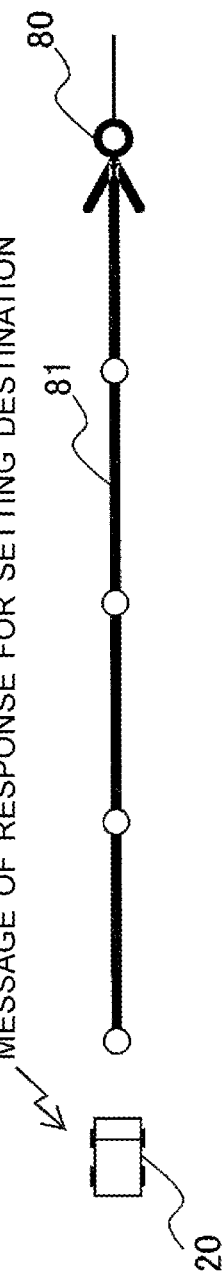

In a state that the loading of topsoil or ore has been completed at the loading site 61 or in a state that dumping has been finished at the dumping site 62 or 63, the dump truck 20 transmits the message of request for setting destination, which requests a destination, to the control server 31 as depicted in FIG. 7A. In the case of the dump truck 20, the request information processing section 260 determines the current position of the own vehicle and the situation (at a stop) of the vehicle and transmits them via the vehicle-side communication control section 250.

This message of request for setting destination is received by the server-side communication control section 310 in the control server 31, and is transmitted to the traffic control section 320. With reference to the map information in the server-side map information storage section 314a and in view of the situations and the like of other dump trucks 20, the dispatch management section 321 in the traffic control section 320 determines a destination for the dump truck 20 and a path to the destination, and instructs the server-side communication control section 310 to transmit a target response message, which indicates a destination 80 and a path 81 to the destination 80, to the dump truck. The server-side communication control section 310 transmits the target response message to the dump truck 20 via the wireless communication network 40 (see FIG. 7B).

Figure 7C:
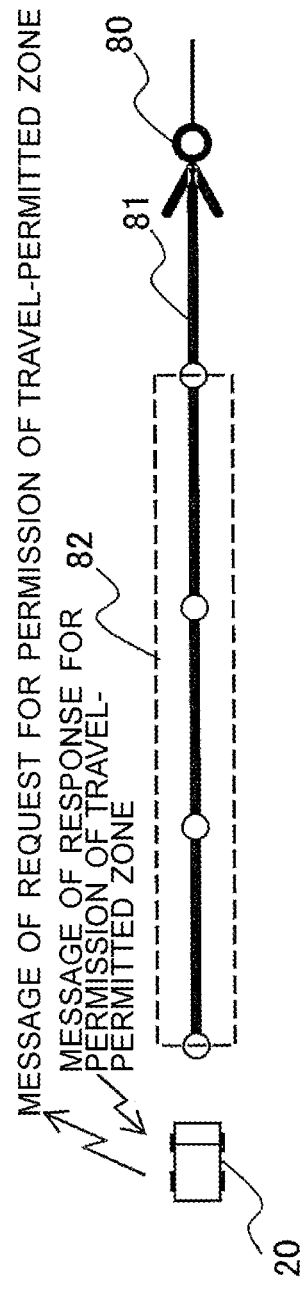

Then, the request information processing section 260 on the dump truck 20 transmits the message of request for permission of a travel-permitted zone, which requests the setting of a second travel-permitted zone, to the control server 31. The server-side communication control section 310 transmits the message of request for permission of a travel-permitted zone to the traffic control section 320. The travel-permitted zone setting section 322 of the traffic control section 320 sets a second travel-permitted zone 82 based on processing to be described below, and transmits the message of response for permission of a travel-permitted zone, which indicates the second travel-permitted zone so set, to the dump truck 20 (FIG. 7C). The message of response for permission of a travel-permitted zone includes information (node ID) that specifically identifies the node of the frontmost end of the second travel-permitted zone and the node ID of its backward boundary end, and information (link ID) that specifically identifies a link or links included in the second travel-permitted zone. The dump truck 20 can begin to travel for the first time upon acquisition of the travel-permitted zone.

On the side of the dump truck 20, on the other hand, the second travel-permitted zone received from the control server 31 is recorded in the vehicle-side map information storage section 280 on the vehicle, and the autonomous travel control section 270 determines how far the dump truck 20 can travel by autonomously traveling while referring to the second travel-permitted zone.

The second travel-permitted zone is defined using the forward boundary node ID, the backward boundary node ID, and one or more link IDs located between the forward boundary node ID and the backward boundary node ID, in other words, specific information (link ID or IDs) specifically indicating one or more links 65 included in the travel-permitted zone, all of which are included in the message of response for permission of a travel-permitted zone.

Concurrently with the setting of the new travel-permitted zone, the travel-permitted zone through which the dump truck 20 has already passed is canceled.

With reference to FIGS. 8A to 8C, a description will next be made about the details of setting of travel-permitted zones. In FIG. 8A, the dump trucks 20-1,20-2 are vehicles in traveling, and reference signs 81-1,81-2 designate travel-permitted zones permitted to the respective vehicles. The dump trucks 20-1,20-2 are both assumed to be traveling in a direction indicated by arrow A. Reference sign 83 designates a remaining travel-permitted distance indicating a distance along a travel lane from the current position of the dump truck 20-1 to the frontmost end (terminal) of the travel-permitted zone 81-1. Reference sign 84 designates a travel permission request starting distance indicating a distance from the frontmost end (terminal) to a point where the dump truck 20-1 initiates the transmission of the message of request for permission of a travel-permitted zone.

The travel permission request starting distance 84 is a distance longer than a distance within which the dump truck can stop, for example, the sum of a stoppable distance and a predetermined offset distance. The stoppable distance L of the dump truck can be determined by the following formula (1):

$$L = c\frac{mv^2}{2f} \quad (1)$$

where, m: mass of the vehicle, including its payload,
v: current speed of the vehicle,
f: braking force of the vehicle,
c: offset factor specified corresponding to a safety factor.

The offset factor c is a value of 1 or greater, and is set by taking into consideration, for example, a time required for wireless communication, the frequency of occurrence of troubles in wireless communication, and the like. The speed of the vehicle may be one obtained by measuring the current speed of the vehicle, for example, from the rotational speed of a wheel, or using the speed limit (maximum allowable speed) specified in the map information for the current traveling position of the vehicle.

As depicted in FIG. 8A, when the remaining travel-permitted distance 83 of the dump truck 20-1 has decreased to the travel permission request starting distance 84 or shorter, the dump truck 20-1 transmits the message of request for permission of a travel-permitted zone to the control server 31. This message of request for permission of a travel-permitted zone also includes the own vehicle position information of the dump truck 20-1.

Upon reception of the zone request information from the dump truck 20-1, the control server 31 specifies the travel segment, where the dump truck 20-1 exists, by using the transmitted own vehicle position information. The control server 31 then issues a travel permission over a zone that is equal to or longer than a predetermined shortest distance (permission-issued travel length), which is to be given as a second travel-permitted zone, along the traveling direction of the dump truck 20-1 from the terminal of the segment where the dump truck 20-1 exists. However, if there is a zone over which a travel permission has been given to another vehicle, a travel permission is issued up to before the zone.

In the example depicted in FIG. 8B, the segment where the dump truck 20-1 exists is indicated at a segment 85, and the zone equal to or longer than a permission-issued travel length 95 from the terminal of the segment extends over segments 86,87,88,89. However, a travel permission over the segments 88,89 has already been given to the dump truck 20-2, so that a travel permission is given for the segments 86,87. It is to be noted that, because a travel permission has already been given for the segment 86, the zone 87 will be given as a new second travel-permitted zone as a consequence.

The zone over which the travel permission has been given is canceled when the distance from the position of the vehicle to the backward boundary of the zone has increased to the travel permission canceling distance or longer subsequent to the passing of the vehicle through the zone. In the example of FIG. 8C, at a stage that a distance 91 from the vehicle 20-2 to the backward boundary of the zone has increased to a travel permission canceling distance 92 or longer, the zone 88 over which a travel permission has been given to the dump truck 20-1 is canceled, and a travel permission over the zone 88 can then be allocated to the following dump truck 20-1.

The first travel-permitted zone can also be set in a similar logic as the second travel-permitted zone.

Responsive to the message of request for permission of a travel-permitted zone from the manned vehicle or unmanned vehicle, the travel-permitted zone setting section 322 of the control server 31 sets a first/second travel-permitted zone for the vehicle, which has transmitted the message of request for permission of a travel-permitted zone, on the travel lane of the vehicle. The first/second travel-permitted zone is a zone in which only the corresponding vehicle is permitted to travel and the other vehicle is prohibited from entering, and therefore functions as a closed zone for the other vehicle. Accordingly, no interference arises between both the autonomous traveling vehicle and the manned vehicle insofar as these vehicles are each traveling in the first/second travel-permitted zone set for the own vehicle.

However, the autonomous traveling vehicle is a large mining dump truck, and is greater compared with the body of the manned vehicle. Even if no interference arises, the operator of the manned vehicle may hence feel a psychological pressure when the manned vehicle comes close to the traveling, autonomous traveling vehicle.

To avoid such a situation that the manned vehicle passes the oncoming autonomous traveling vehicle in traveling or is passed by the autonomous traveling vehicle, this embodiment, therefore, also sets a travel-permitted zone for the manned vehicle on an adjacent lane in addition to a travel-permitted zone set for the manned vehicle, and causes the oncoming autonomous traveling vehicle to stop when the manned vehicle passes the oncoming autonomous traveling vehicle. Even when the manned vehicle performs work in another lane arranged side by side with the own lane, it is therefore possible to avoid interference between the working manned vehicle and the autonomous traveling vehicle.

Figure 10A:
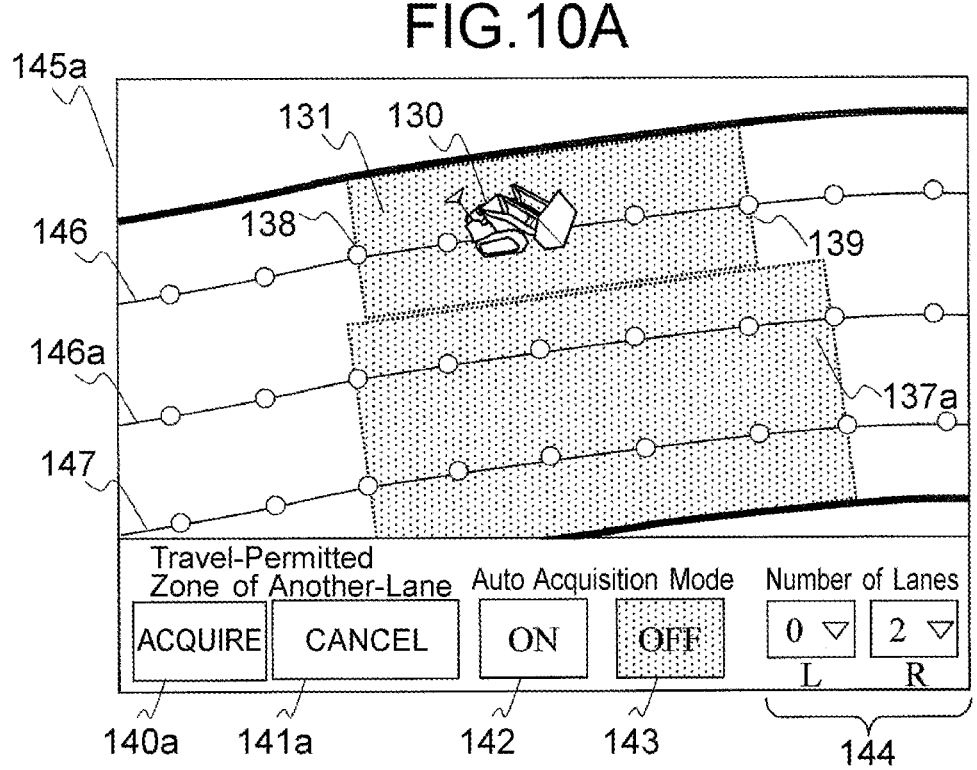
Figure 10B:
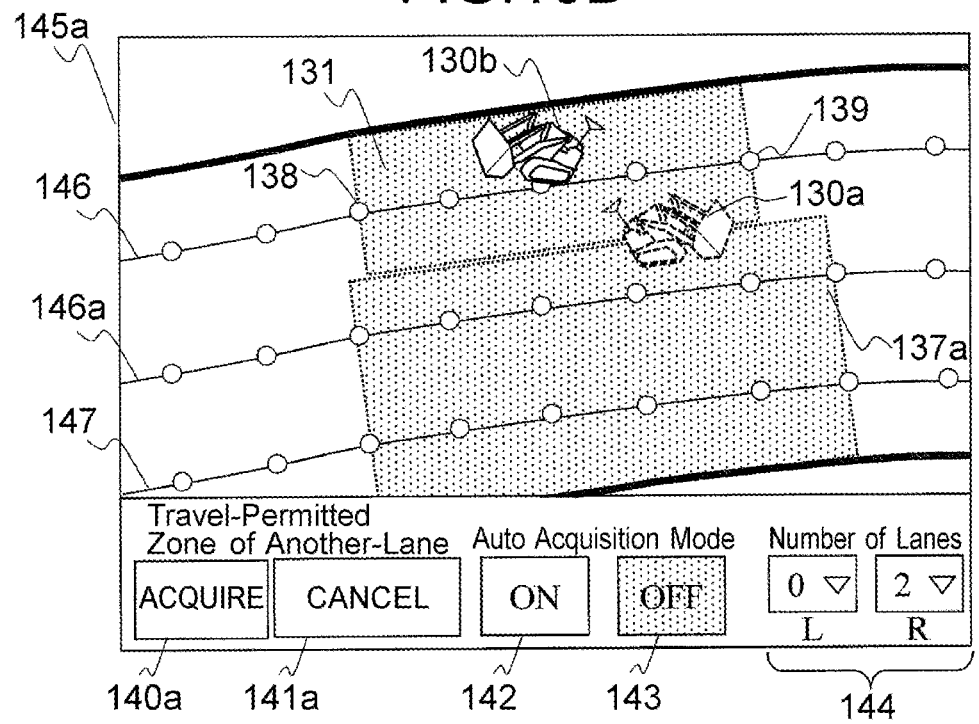
Figure 11A:
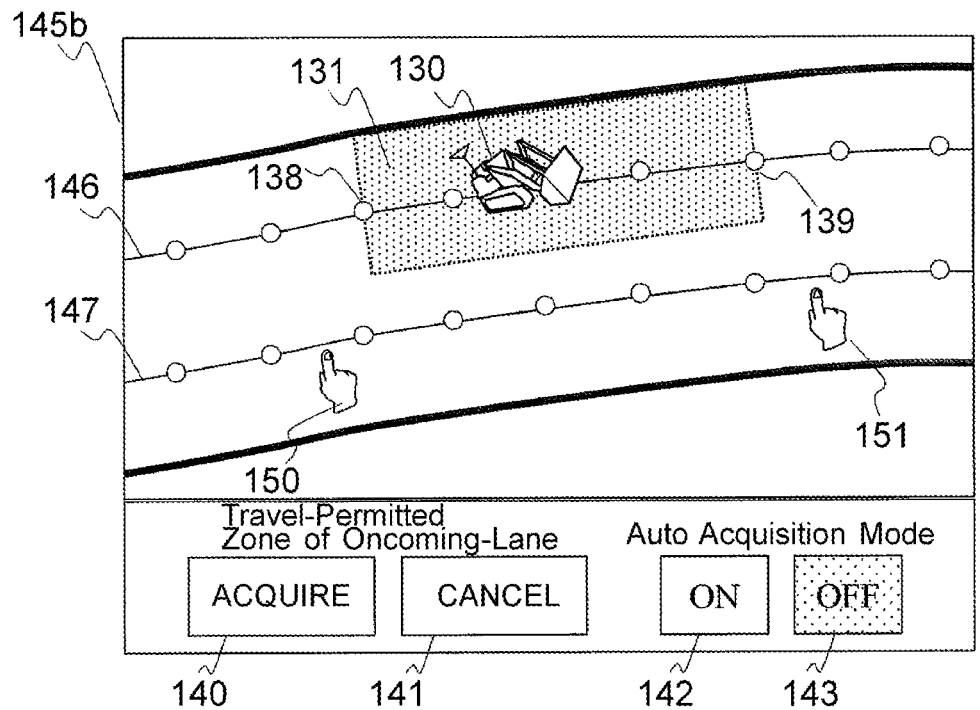
Figure 11B:
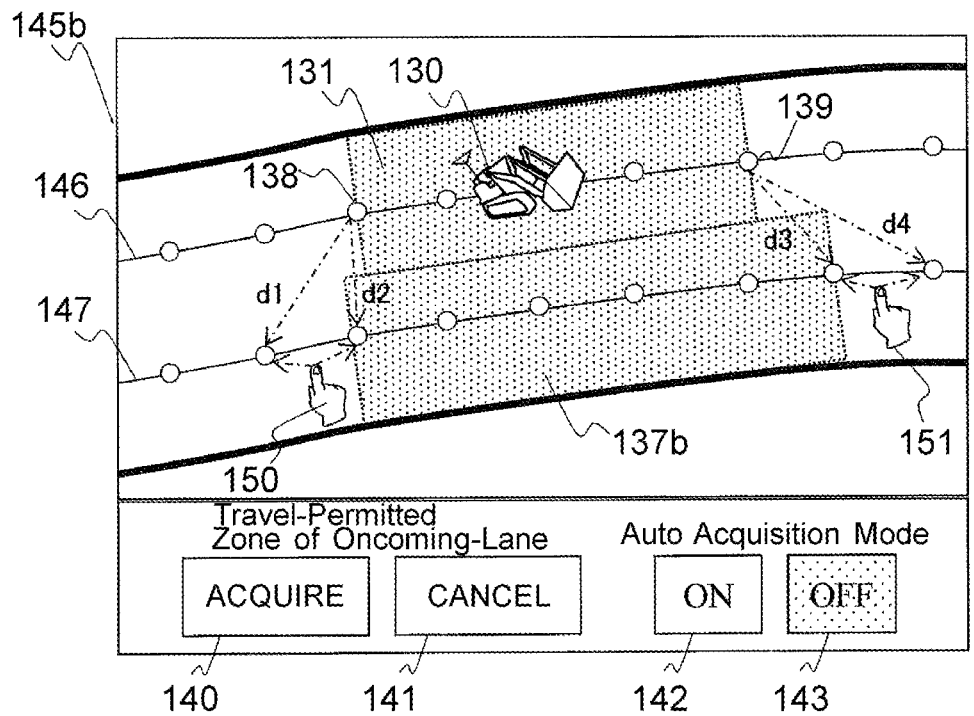
Figure 12:
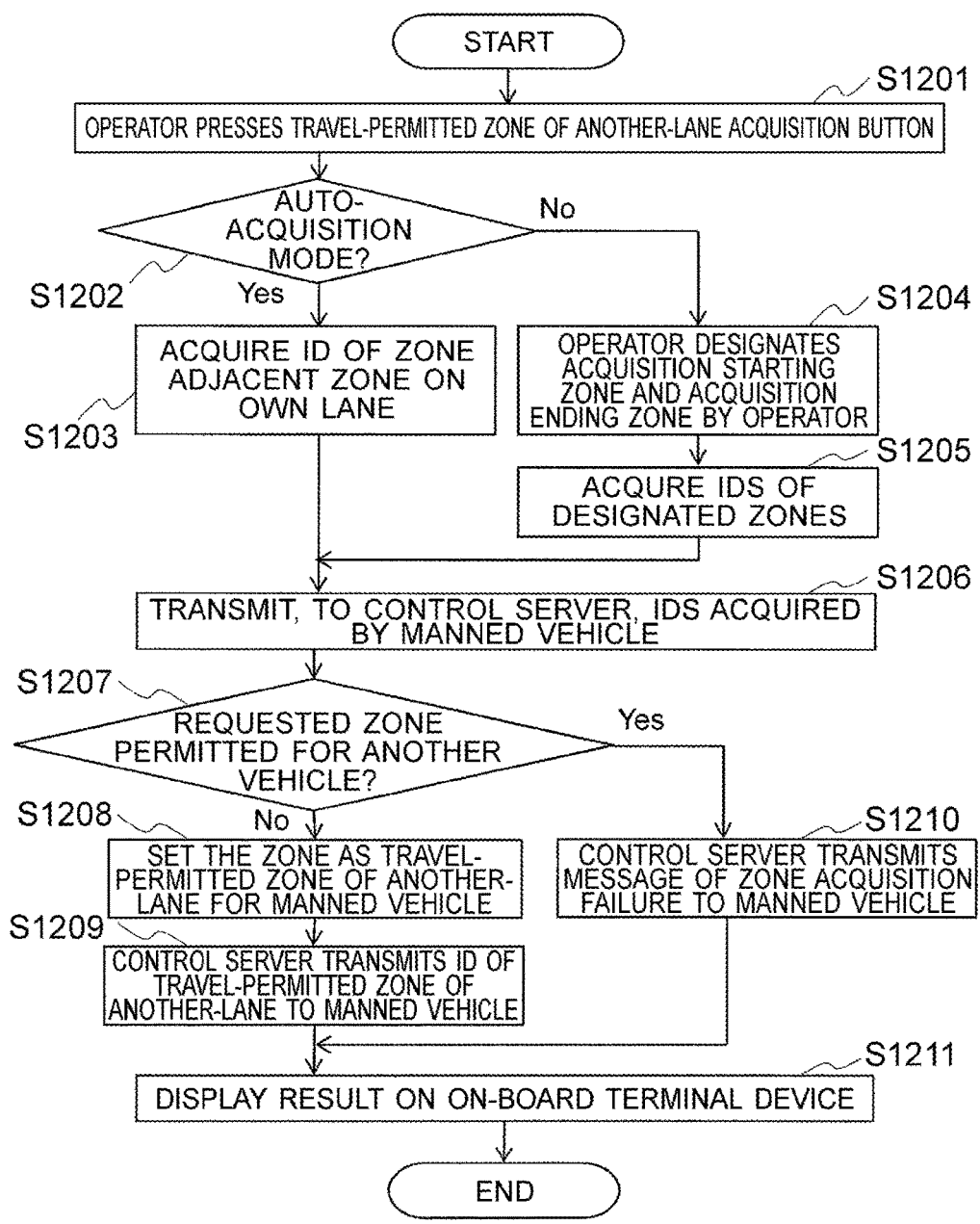
FIG. 12 is a flow chart describing procedures that an another-lane travel permitting section of the control server permits the manned vehicle to travel through a travel-permitted zone of the oncoming lane when the operator of the manned vehicle has performed operation on the basis of the screens of FIGS. 9A and 9B.
Figure 13:
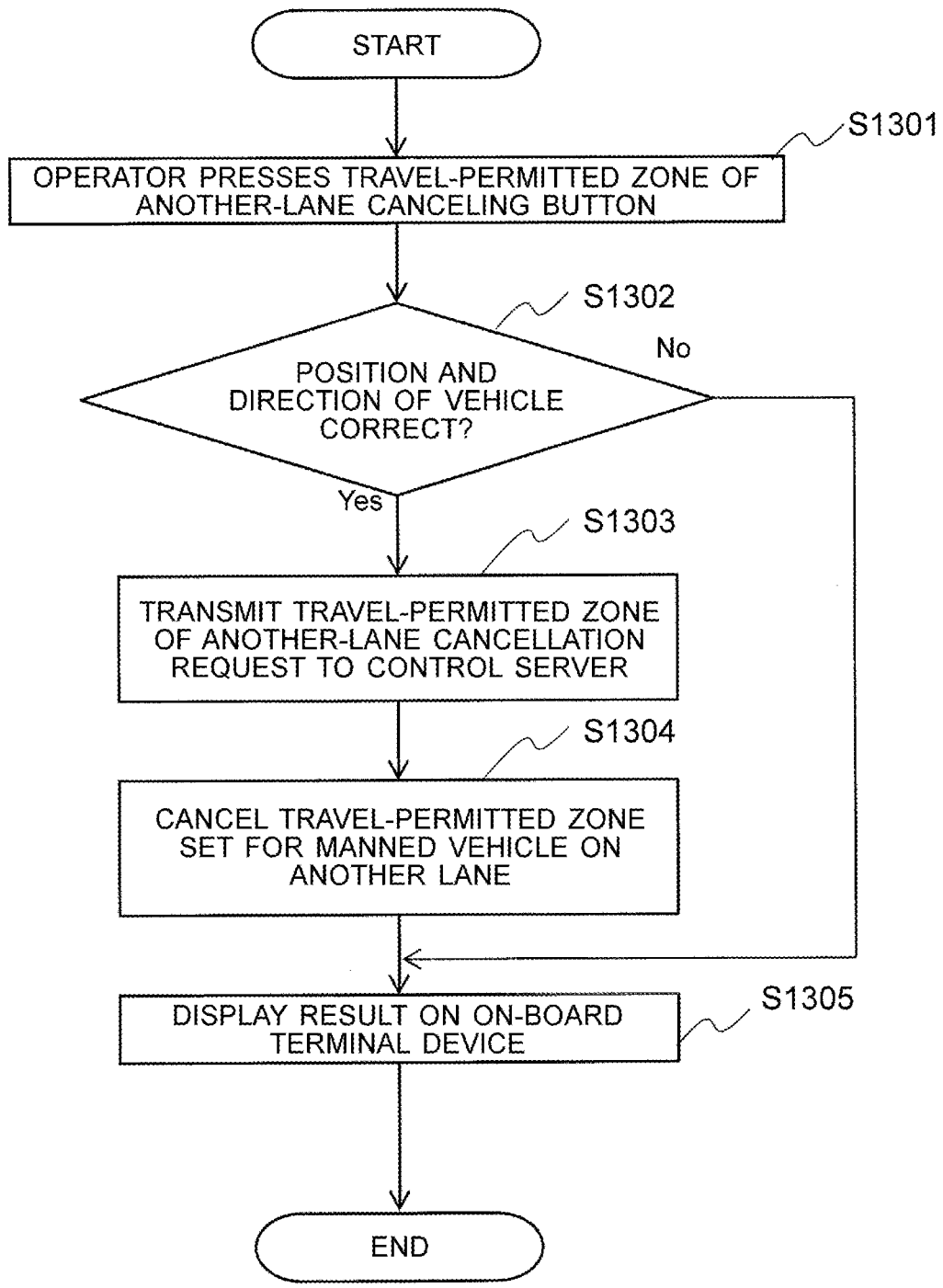
FIG. 13 is a flow chart describing operation procedures when the manned vehicle cancels the travel-permitted zone on the oncoming lane.

In this embodiment, as a configuration for ensuring the safety of the manned vehicle 90 that is traveling or is working in an adjacent lane, the navigation system 900 is mounted in the manned vehicle 90 and the control server 31 is provided with the travel-permitted zone setting section 322 and another-lane travel permitting section 323, as described above. About examples of display screens of the navigation system 900 and processing that sets a travel-permitted zone of another-lane by operation inputted through the navigation system 900, a description will hereinafter be made with reference to FIG. 9A through FIG. 11B. FIGS. 9A and 9B are examples of screens displayed on the display device 906 of the navigation system 900 installed in a bulldozer (manned vehicle), in which FIG. 9A is a view showing a screen before the manned vehicle acquires a zone on an oncoming lane as a travel-permitted zone, and FIG. 9B is a view showing a screen after the manned vehicle has acquired the zone on the oncoming lane as the travel-permitted zone. FIGS. 10A and 10B are examples of screens displayed on the display device 906 of the navigation system. 900 installed in the bulldozer (manned vehicle), in which FIG. 10A is a view showing a screen after the bulldozer has acquired a zone over adjacent two lanes as a travel-permitted zone, and FIG. 10B is a view showing a screen in a state that the bulldozer has finished work and returned to the own lane but the direction of its body is opposite to the traveling direction. FIGS. 11A and 11B are examples of screens displayed on the display device 906 of the navigation system. 900 installed in the bulldozer (manned vehicle), in which FIG. 11A is a view of a screen showing a state that the operator of the manned vehicle has manually designated two points desired to acquire a travel-permitted zone of the oncoming lane, and FIG. 11B is a view showing a screen after boundary points of the zone desired to be acquired have been searched and the manned vehicle has acquired the zone on the oncoming lane as a travel-permitted zone. FIG. 12 is a flow chart describing procedures that the another-lane travel permitting section 323 of the control server 31 permits the manned vehicle to travel through a travel-permitted zone of the oncoming lane when the operator of the manned vehicle has performed operation on the basis of the screens of FIGS. 9A and 9B. FIG. 13 is a flow chart describing operation procedures when the manned vehicle cancels the travel-permitted zone on the oncoming lane.

In FIG. 9A, a screen 145 is a screen of the display device 906 mounted in the bulldozer traveling on a haul road with one lane arranged in each direction. Reference sign 130 indicates the bulldozer, and the reference sign numeral 131 designates the travel-permitted zone set for the bulldozer 130. Reference sign 146 indicates a travel lane (own lane) on which the bulldozer 130 is traveling, and reference sig 147 designates the oncoming lane. Arranged in a lower part of the screen are a zone of an oncoming-lane acquisition button 140, a zone of an oncoming-lane cancellation button 141, an auto-acquisition mode ON button 142, and an auto-acquisition mode OFF button 143. These buttons may be displayed on the screen to permit their operation through a touch panel, or may be arranged as physical buttons instead of being displayed on the screen.

In FIG. 10A, a screen 145a is a screen of the display device 906 mounted in the bulldozer that performs work on three lanes in total, that is, an own lane (climbing lane), a travel lane arranged adjacent and side by side with the own lane, and an oncoming lane. Reference sign 130 designates the bulldozer, and reference sign 131 indicates the travel-permitted lane set for the bulldozer 130. Further, the reference sign 146 indicates the own lane on which the bulldozer is traveling, sign 146a designates a travel lane (lane arranged side by side), and the reference sign 147 represents the oncoming lane. Arranged in a lower part of the screen are a zone of an another-lane acquisition button 140a, an zone of an another-lane cancellation button 141a, an auto-acquisition mode ON button 142, an auto-acquisition mode OFF button 143, and number-of-lanes input buttons 144 which are each used to input the number of other lane or lanes on or over which a zone is to be acquired. The zone of an another-lane acquisition button 140a and the zone of an another-lane cancellation button 141a are buttons to be operated upon inputting and canceling a setting request for a travel-permitted zone of another-lane, respectively, like the zone of an oncoming-lane acquisition button 140 and the zone of an oncoming-lane cancellation button 141 in FIG. 9, but have been changed in wording because in the examples of FIGS. 10A and 10B, a lane other than the oncoming lane is also included as a further lane.

The number-of-lanes input buttons 144 are buttons for inputting the number of other lane or lanes, which are arranged on the right side (R) of the own lane as viewed in the traveling direction and are to be acquired, and the number of other lane or lanes, which are arranged on the left side (L) of the own lane as viewed in the traveling direction and are to be acquired, respectively. As the bulldozer 130 is traveling on the lane 146 in FIG. 10A, two (2) lanes and zero (0) lane are designated on the right side and the left side, respectively, through the number-of-lanes input buttons 144 to acquire a travel-permitted zone of another-lane 137a over the two lanes on the right side. If the bulldozer 130 is traveling on the lane 146 and a zone is desired to be acquired over all the three lanes, one (1) lane and one (1) lane are designated on the right side and the left side, respectively, through the number-of-lanes input buttons 144. If a zone is desired to be acquired only on the lane 146a adjacent the bulldozer 130 on the own lane 146, one (1) lane and zero (0) lane are designated on the right side and the left side, respectively, through the number-of-lanes input buttons 144.

Now, the operator is assumed to have operated the zone of an another-lane cancellation button 141a in FIG. 10B. If a bulldozer 130a is at a position where it straddles the two travel-permitted zones 131,137a, in other words, the bulldozer 130a is at a position where it is not included within any single travel-permitted zone or if the traveling direction of the lane corresponding to the travel-permitted zone 131 and the direction of the body of a bulldozer 130b do not agree each other despite the inclusion within a single travel-permitted zone like the bulldozer 130b, the CPU 901 does not actively transition the zone of an another-lane cancellation button 141a without generation of any cancellation request message even when the command input accepting section 990 detects operation on the zone of an another-lane cancellation button 141a.

In FIG. 11A, a screen 145b is a screen of the display device 906 mounted in the bulldozer 130 traveling on a road having one lane in each direction.

Upon manually making an acquisition request for a travel-permitted zone of another-lane, the operator presses two points 150,151 close to an oncoming lane on a touch panel in a state that the auto-acquisition mode OFF button 143 has been selected. Concerning the point 150, for example, the command input accepting section 990 extracts two nodes, which are adjacent the point 150, from the map information, and calculates distances d1,d2 between the extracted respective nodes and closer one of the forward and backward boundary points of the first travel-permitted zone 131 (the backward boundary point in FIG. 11B). The node of a shorter distance, specifically the node at the distance d2 from the backward boundary point is then selected as one of the boundary points of a travel-permitted zone of another-lane.

Similarly, with respect to the point 151, two nodes adjacent the point 151 are extracted, and distances d3,d4 between the extracted respective nodes and closer one of the forward and backward boundary points of the first travel-permitted zone (the forward boundary point in FIG. 11B) are calculated. The node of a shorter distance, specifically the node at the distance d3 from the forward boundary point is then selected as the other boundary point of the travel-permitted zone of another-lane. As a consequence, a zone 137b shown in FIG. 11B is inputted as an acquisition-requested zone for the travel-permitted zone of another-lane.

As the command input accepting section 990 has an algorism that searches the boundary points of the above-described acquisition-requested zone, the zone between the nodes can be set as the acquisition-requested zone even if input operation of positions departing from another lane is performed when the operator manually inputs the acquisition-requested zone. The operator is, therefore, no longer required to precisely select nodes, leading to improvements in operational convenience. The above-described algorism is merely one example of an acquisition-requested zone by manual operation, and other algorisms will also be referred to in flow charts to be described subsequently herein.

Following the flow chart of FIG. 12, a description will be made of operation that the another-lane travel permitting section 323 gives the manned vehicle a travel permission for a zone on an oncoming lane.

Firstly, the operator on the bulldozer 130 presses the zone of an oncoming-lane acquisition button 140 if the operator wishes to work in a region on another lane (S1201). In the case of a haul road having three lanes or more, the operator presses the zone of an another-lane acquisition button 140a and the number-of-lanes input buttons 144 instead of the zone of an oncoming-lane acquisition button 140.

If the acquisition of a travel-permitted zone in an auto-acquisition mode is desired here, it is necessary to press the auto-acquisition mode ON button 142 in advance and to confirm that the button has been activated. If the acquisition in a manual acquisition mode is desired, on the other hand, it is necessary to press the auto-acquisition mode OFF button 143 beforehand and to confirm that the button has been activated.

If the navigation system 900 is in the auto-acquisition mode when the zone of an oncoming-lane acquisition button 140 or the zone of an another-lane acquisition button 140a is pressed (S1202/Yes), the command input accepting section 990 acquires the ID of a travel-permitted zone of the oncoming lane or another lane, which is adjacent the travel-permitted zone for the own vehicle as currently set on the own lane, with reference to the vehicle-side map information storage section 980 (S1203). In association with travel-permitted zones for the own vehicle on the own lane, adjacent zones may be held beforehand in the vehicle-side map information storage section 980, or it may be configured to calculate such an adjacent zone by conducting a geometric calculation whenever necessary. As the segments on the another lane, the IDs of which are to be acquired here, a series of segments 132,133,134,135,136 may be selected including links 132,136 formed of the nodes at two points on the oncoming lane, the two points being closest from endpoints 138,139 of the travel-permitted zone on the own lane, in FIG. 9A, for example.

If the navigation system 900 has been set in the auto-acquisition mode (S1202/No), the command input accepting section 990 makes the request information processing section 960 also transmit the message of request for permission of a travel-permitted zone of an another-lane, which makes a setting request for a zone of an another-lane, in combination upon transmitting the message of request for permission of a travel-permitted zone to make a setting request for a next (new) travel-permitted zone. For example, a flag area, which indicates the need/no need of the message of request for permission of a travel-permitted zone, is provided beforehand in a predetermined area of a memory incorporated in the navigation system 900, and in the case of the auto-acquisition mode, "1" is set beforehand at the flag area. Referring to the flag area before the request information processing section 960 transmits the message of request for permission of a travel-permitted zone, a message of request for permission of a travel-permitted zone of an another-lane is also transmitted together with the message of request for permission of a travel-permitted zone if "1" has been set. As a consequence, once the operator performs operation to set in the auto-acquisition mode, following the acquisition of a new travel-permitted zone set during traveling of the manned vehicle, a zone on another lane, the zone being side by side with the new travel-permitted zone, can be also acquired as a travel-permitted zone.

As another example, the above-described flag area is secured beforehand in the memory incorporated in the control server 31. When set in the auto-acquisition mode, the command input accepting section 990 transmits the message of request for permission of a travel-permitted zone of an another-lane to the control server 31 to set "1" in the flag area of the control server 31. It may be configured so that the another-lane travel permitting section 323 sets a travel-permitted zone at a zone on another lane, the zone being adjacent a first travel-permitted zone newly set for the manned vehicle whenever the control server 31 receives the message of request for permission of a travel-permitted zone until the control server 31 subsequently receives a message that makes a cancellation request for a travel-permitted zone of the another-lane. In this configuration, the another-lane travel permitting section 323 also performs the cancellation of the travel-permitted zone of another-lane set following the first travel-permitted zone in combination with the cancellation of the first travel-permitted zone.

If the navigation system 900 is in the manual acquisition mode when a zone the zone of an oncoming-lane acquisition button 140 or the zone of an another-lane acquisition button 140a is pressed (S1202/No), the operator performs designation of a zone on the another lane (S1204). As an illustrative manner for the designation of the zone, the operator designates, by touches or the like, desired two points with the another lane interposed between the two points on the screen (see FIGS. 11A and 11B), whereby a rectangular area including the two points as diagonally opposite vertices thereof are formed. A zone on the lane, which zone is included in the rectangular area, may then be extracted as an acquisition request zone. Here, it may be configured to designate not only the zone on the lane but also a zone on the own lane. As an alternative, it may also be configured to designate desired two segments on the lane by touches or the like and to extract a series of segments, which include the desired two segments, as a designated zone.

The command input accepting section 990 acquires the IDs of the segments, which have been designated as described above, with reference to the vehicle-side map information storage section 980 (S1205).

Subsequent to the acquisition of the ID of the segments on the another lane in the above-described manner, the command input accepting section 990 of the manned vehicle generates the message of request for permission of a travel-permitted zone of an another-lane including the acquired segment IDs, and transmits it to the control server 31 via the vehicle-side communication control section 950 (S1206).

At the control server 31, the another-lane travel permitting section 323 receives via the server-side communication control section 310 the message of request for permission of a travel-permitted zone of an another-lane including the acquired segment IDs. The another-lane travel permitting section 323 confirms, with reference to the zone information in the zone information storage section 314b, whether the zone has been permitted to another vehicle (S1207).

If the acquisition-requested zone is not included in any of the first travel-permitted zone, second travel-permitted zone or travel-permitted zone of another-lane for the another vehicle and no travel permission has been given to the another vehicle (S1207/No), the zone is set as a travel-permitted zone of another-lane for the manned vehicle and is written in the zone information in the zone information storage section 314b (S1208), and the travel-permitted zone of another-lane so set is transmitted to the manned vehicle via the server-side communication control section 310 (S1209).

If the designated zone has been permitted to an another vehicle (S1207/Yes), the control server 31 transmits a message of acquisition failure of a travel-permitted zone of another-lane to the manned vehicle (S1210).

The display control section 970 of the manned vehicle receives via the vehicle-side communication control section 950 the message transmitted from the control server 31, and displays a reception result on an on-board terminal device (S1211).

If succeeded in the acquisition of the zone, a zone 137 (see FIG. 9B), the zone 137a (see FIG. 10A) or the zone 137b (see FIG. 11B), which has been designated on the lane, is displayed in a color as a travel-permitted zone for the manned vehicle on the screen.

With reference to FIG. 13, a description will next be made of operation procedures to cancel the travel-permitted zone on the lane as acquired in the above-described manner. FIG. 13 is a flow chart showing the operation procedures to cancel the travel-permitted zone on the lane.

Firstly, the operator of the manned vehicle presses the zone of an another-lane cancellation button 141 or 141a (S1301).

If the body of the manned vehicle is included within the first travel-permitted zone and the direction of the body matches the traveling direction of the first travel-permitted zone or if the body of the manned vehicle is included within the travel-permitted zone of another-lane and the direction of the body matches the traveling direction of the travel-permitted zone of another-lane (S1302/Yes), the command input accepting section 990, responsive to the above-described pressing, generates a cancellation request, and transmits it from the vehicle-side communication control section 950 to the control server 31 (S1303).

If the position or direction of the vehicle is not correct (S1302/No), the cancellation of the travel-permitted zone results in a failure, and the navigation system 900 may be configured to display a message of cancellation failure thereon.

Responsive to the message of the cancellation request, the another-lane travel permitting section 323 of the control server 31 cancels the travel-permitted zone of another-lane, and deletes the data of the cancelled travel-permitted zone of another-lane from the zone information in the zone information storage section 314*b* (S1304).

If succeeded in the cancellation of the travel-permitted zone on the oncoming lane, the display control section 970 of the navigation system 900 updates the screen, erases the display of the travel-permitted zone of another-lane for the own vehicle, and displays an image of a first travel-permitted zone in which the own vehicle is traveling currently (S1305).

Figure 14:
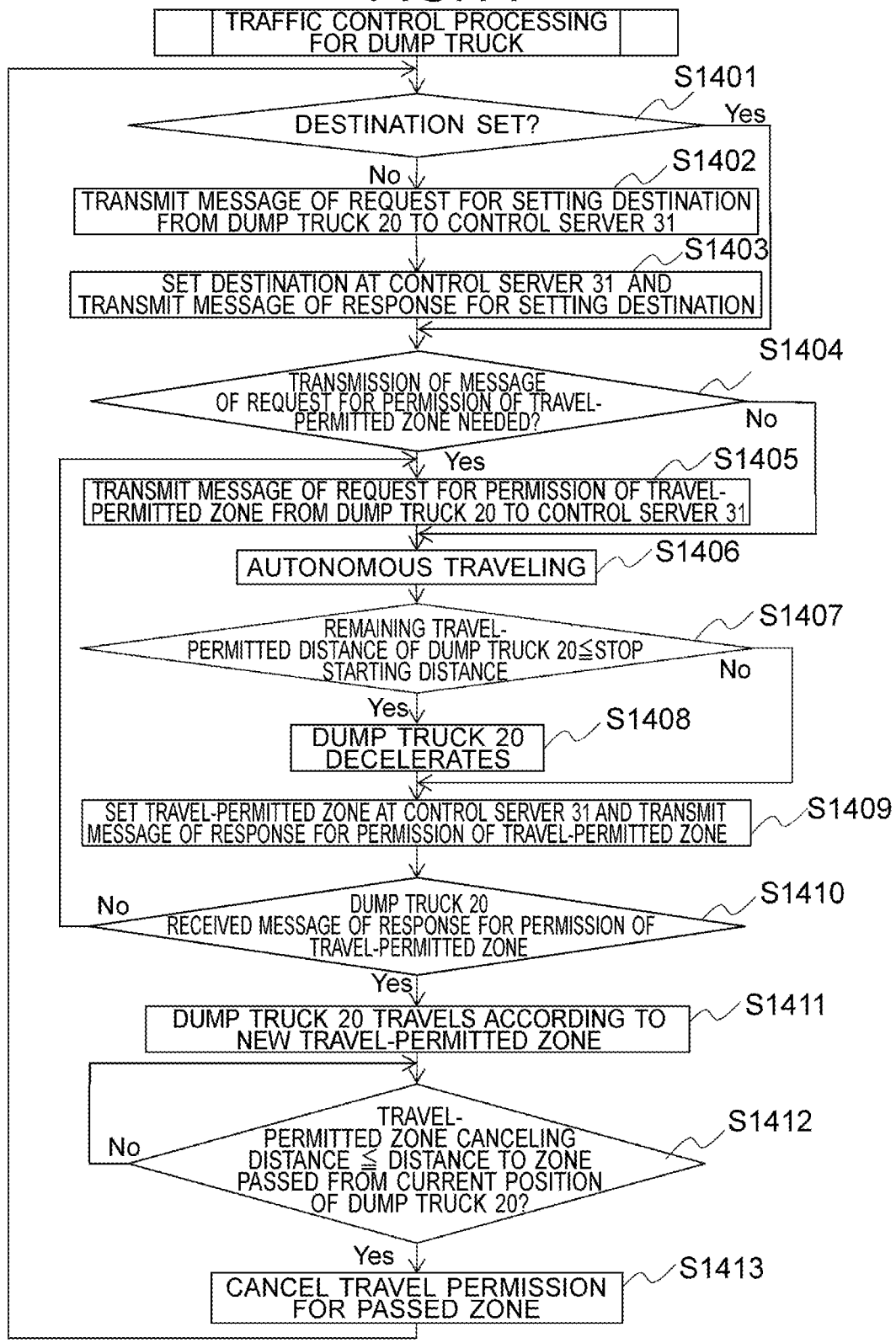
FIG. 14 is a flow chart illustrating a flow of traffic control processing for the dump truck.

Next, a description will be made of the outline of operation procedures of the traffic control system according to this embodiment. FIG. 14 is a flow chart illustrating a flow of traffic control processing for the dump truck. The description will hereinafter be made in the order of the individual steps in FIG. 14.

Firstly, if no destination has been set for the dump truck 20 (S1401/No), the request information processing section 260 of the travel control device 200 transmits the message of request for setting destination (including current position information) to the control server 31 via the wireless communication network 40 (S1402).

The dispatch management section 321 of the control server 31 sets a destination with reference to the current position information of the dump truck 20 and the map information in the server-side map information storage section 314*a*, and transmits the message of response for setting destination, which indicates a result of the above-described setting, to the dump truck 20 (S1403). If the destination of the dump truck 20 has been set (S1401/Yes), subsequent to transmission of the message of response for setting destination, the processing proceeds to step S1404.

If the transmission of the message of request for permission of a travel-permitted zone is needed, for example, if no second travel-permitted zone has been set for the dump truck 20 or if the remaining travel-permitted distance from the current second travel-permitted zone is equal or shorter than the travel permission request starting distance (see FIG. 8A, S1404/Yes), the travel control device 200 transmits the message of request for permission of a travel-permitted zone from the request information processing section 260 (S1405).

If the transmission of the message of request for permission of a travel-permitted zone is not needed, in other words, if a second travel-permitted zone has already been set and the remaining travel-permitted zone is longer than the travel permission request starting distance (S1404/No) and if a sufficient distance still remains to the forward boundary of the travel-permitted zone, in which the own vehicle is currently traveling, even if the message of request for permission of a travel-permitted zone is transmitted, the dump truck 20 autonomously travels (S1406). It is to be noted that the "autonomous traveling" in step S1406 practically means a stopped (not yet started) state of the dump truck 20 because autonomous traveling cannot be performed in the initial loop, specifically in a state that the destination has been set (S1401/Yes) but no travel-permitted zone has been set yet (a situation that the processing of S1409 has not been executed). In this situation, "No" is selected in the next step S1407, a first travel-permitted zone is set in S1409, and autonomous traveling is started by the next loop.

After the transmission of the message of request for permission of a travel-permitted zone, the dump truck 20 waits for reception of the message of response for permission of travel-permitted zone from the control server 31 while continuing to travel according to the currently-given travel-permitted zone. The autonomous travel control section 270 compares the own vehicle position from the position calculating device 220 and the map information in the vehicle-side map information storage section 280 with the currently-given second travel-permitted zone. If the remaining travel-permitted distance is equal or shorter than a stop starting distance (S1407/Yes), the autonomous travel control section 270 gives a braking instruction to the brake device 211 of the travel drive devices 210 so that the dump truck 20 will stop within the second travel-permitted zone, and the dump truck 20 begins to decelerate (S1408). If the remaining travel-permitted distance is longer than the stop starting distance (S1407/No), the dump truck 20 does not apply a brake for the purpose of stopping and continues the autonomous traveling.

Upon reception of the message of request for permission of a travel-permitted zone, the travel-permitted zone setting section 322 sets a new second travel-permitted zone based on the own vehicle position of the dump truck 20 and the map information stored in the server-side map information storage section 314*a*, and the control server 31 transmits the message of response for permission of travel-permitted zone, which indicates details of the new second travel-permitted zone to the dump truck 20 (S1409).

Upon reception of the message of response for permission of travel-permitted zone (S1410/Yes), the dump truck 20 begins to travel according to the new travel-permitted zone indicated in the message of response for permission of travel-permitted zone (S1411). If the dump truck 20 has not received the message of response for permission of travel-permitted zone (S1410/No), the processing returns to step S1405. The situation that no message of response for permission of travel-permitted zone has been received can be, for example, a situation that the zone request information has not reached the control server 31 due to a communication error, or a situation that the message of response for permission of travel-permitted zone has not reached the dump truck 20.

If the distance from the current position of the dump truck 20 to the backward boundary of the zone increases to the travel-permitted zone canceling distance or longer (see FIG. 8C, S1412/Yes), the travel-permitted zone setting section 322 cancels the setting of the travel-permitted zone (S1413). The travel-permitted zone setting section 322 deletes information that indicates the travel-permitted zone cancelled from the zone information. Subsequently, the processing returns to step S1401. Further, if the distance from the current position of the dump truck 20 to the backward boundary of the zone is shorter than the travel permission canceling distance (S1412/No), the travel-permitted zone setting section 322 does not cancel the travel-permitted zone until the distance from the current position of the dump truck 20 to the backward boundary of the zone increases to the travel permission canceling distance or longer, and the dump truck travels (S1412).

Figure 15:
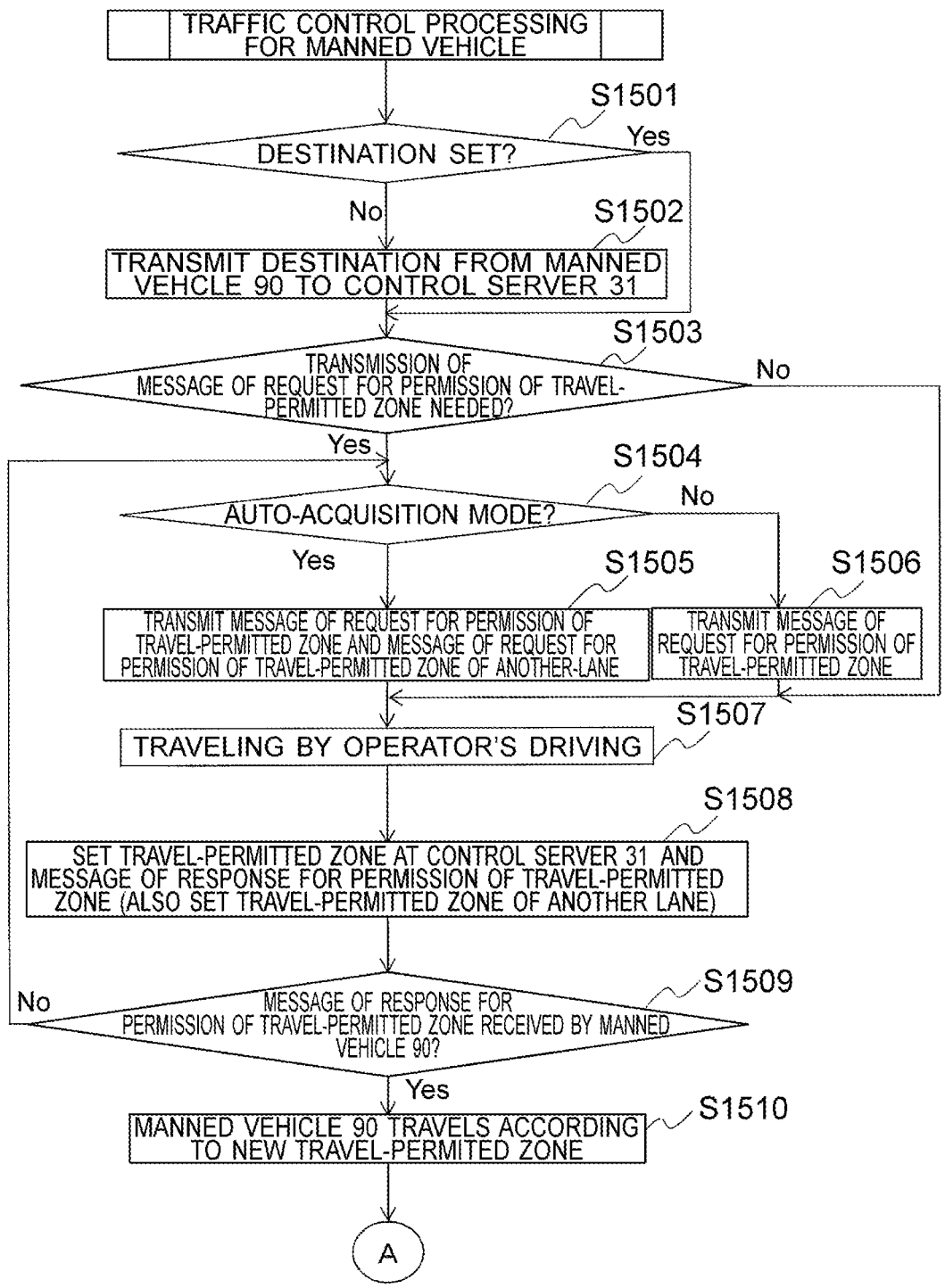
FIG. 15 is a flow chart illustrating a former half of traffic control processing for the manned vehicle.
Figure 16:
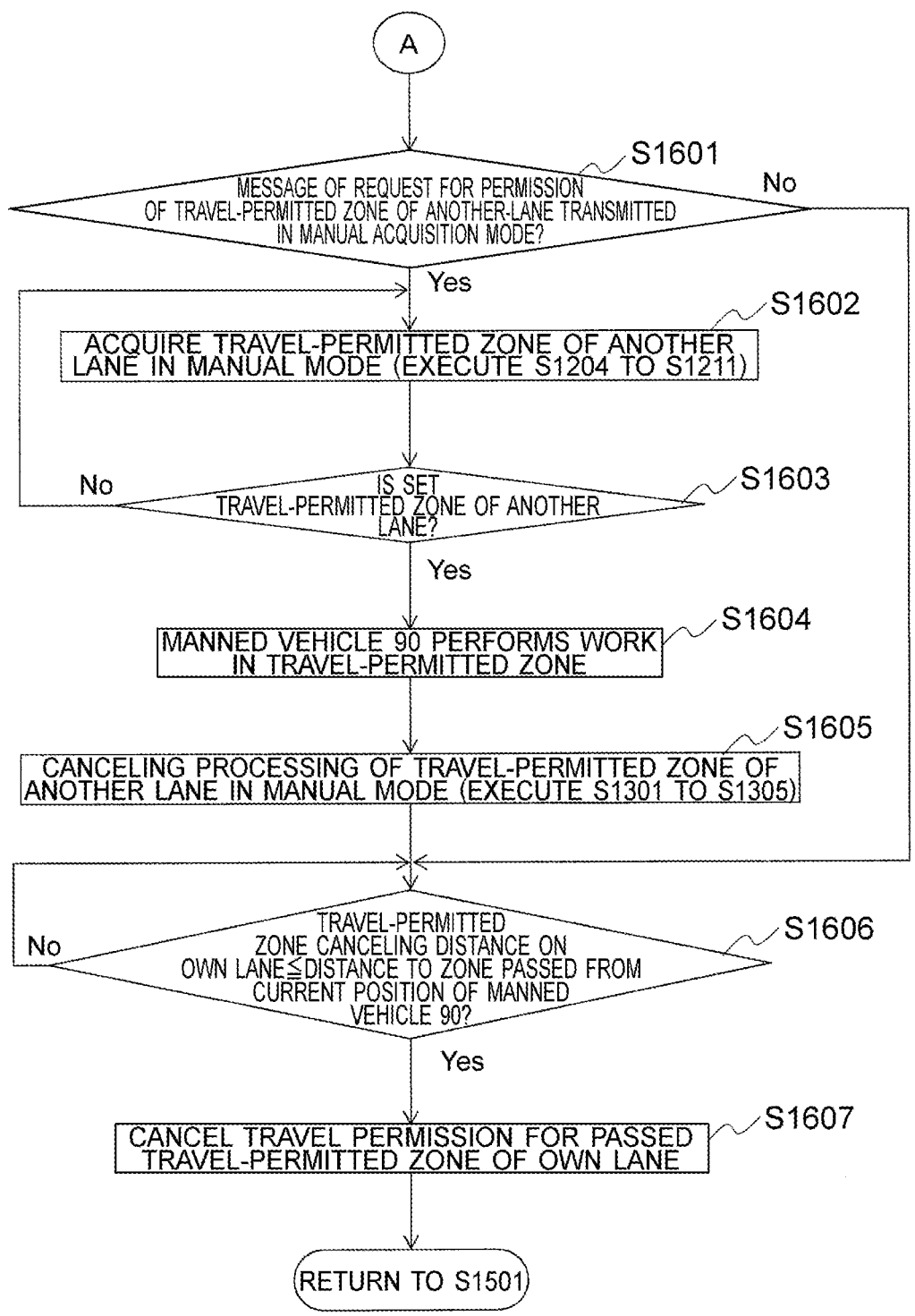
FIG. 16 is a flow chart illustrating a latter half of the traffic control processing for the manned vehicle.

Referring next to FIG. 15 and FIG. 16, a flow of traffic control processing for the manned vehicle will be described. FIG. 15 is a flow chart illustrating a former half of the traffic control processing for the manned vehicle. FIG. 16 is a flow chart illustrating a latter half of the traffic control processing for the manned vehicle. The processing for the manned vehicle is different from that for the dump truck in that a destination is determined not by the control server 31 but by the operator and that travel control is executed by operator's driving. A description will hereinafter be made in the order of the individual steps of FIG. 15 and FIG. 16. It is to be noted that a description is omitted about operational details overlapping with the description of FIG. 14.

Firstly, if no destination has been set for the manned vehicle 90 (S1501/No), the operator designates a destination by the input device 907, and the destination is transmitted to the control server 31 (S1502). If a destination has been set (S1501/Yes), the destination is transmitted to the control server 31, and the processing proceeds to step S1503.

Similar to the dump truck, if transmission of the message of request for permission of a travel-permitted zone is needed and the navigation system 900 has been set in the auto-acquisition mode (S1503/Yes, S1504/Yes), a zone request message is transmitted from the request information processing section 960, and at the same time, the message of request for permission of a travel-permitted zone of an another-lane is transmitted from the request information processing section 960 or command input accepting section 990 (S1505). As already mentioned, the navigation system 900 may transmit the message of request for permission of a travel-permitted zone of an another-lane together with a zone request information every time, or may transmit the message of request for permission of a travel-permitted zone of an another-lane only once until a cancellation request message is transmitted.

If transmission of the message of request for permission of a travel-permitted zone is needed and the navigation system 900 has not been set in the auto-acquisition mode, in other words, has been set in the manual acquisition mode (S1503/Yes, S1504/No), the message of request for permission of a travel-permitted zone is transmitted from the request information processing section 960 (S1506).

If transmission of the message of request for permission of a travel-permitted zone is not needed (S1503/No), if the message of request for permission of a travel-permitted zone has been transmitted (S1506), and if the message of request for permission of a travel-permitted zone of an another-lane has also been transmitted in combination (S1505), the operator who is driving the manned vehicle continues to travel while avoiding straying from the travel-permitted zone with reference to the display screen of the navigation system 900 (S1507). It may be configured to display, on the display device 906, the travel-permitted zone for the own vehicle and the own vehicle position in superimposition over the map information of the mine.

When the control server 31 receives the message of request for permission of a travel-permitted zone, the travel-permitted zone setting section 322 sets a travel-permitted zone based on the own vehicle position of the manned vehicle and the map information stored in the server-side map information storage section 314a. If necessary, the another-lane travel permitting section 323 sets a travel-permitted zone of another-lane, and transmits the message of response for permission of travel-permitted zone, which indicates details of the travel-permitted zone of another-lane, to the manned vehicle (S1508).

Upon reception of the message of response for permission of travel-permitted zone (S1509/Yes), the manned vehicle travels while being driven by the operator according the new first travel-permitted zone indicated in the message of response for permission of travel-permitted zone (S1510). If a travel-permitted zone of another-lane has been set, the manned vehicle is allowed to stray into the travel-permitted zone of another-lane. If the manned vehicle has not received the message of response for permission of travel-permitted zone (S1509/No), the processing returns to step S1504.

If the navigation system 900 has transmitted the message of request for permission of a travel-permitted zone of an another-lane in the manual acquisition mode (S1601/Yes), acquisition processing of a travel-permitted zone on another lane in the manual mode (step S1204 to step S1211) is executed (S1602).

If the travel-permitted zone of another-lane is set (S1603/Yes), message of response for permission of a travel-permitted zone of an another-lane is transmitted. The zone can no longer be entered by other vehicles so that work or a U-turn can be performed in a travel-permitted zone set over the own lane and the another lane (S1604).

Upon completion of the work by the manned vehicle, cancellation processing of the travel-permitted zone of another-lane (see step S1301 to step 1305) is executed, and the travel-permitted zone on the another lane is cancelled (S1605). Subsequently, the manned vehicle travels along the travel-permitted zone for the own vehicle.

If the navigation system 900 has been set in the auto-acquisition mode (S1601/No) and if the manned vehicle has resumed traveling along the travel-permitted zone for the own vehicle and the distance from the current position of the manned vehicle to the backward boundary of the zone has increased to the travel permission canceling distance or longer (see FIG. 8C, S1606/Yes), the travel-permitted zone setting section 322 cancels the setting of the travel-permitted zone on the own lane (S1607). The travel-permitted zone setting section 322 deletes information that indicates the travel-permitted zone cancelled from the zone information. Subsequently, the processing returns to step S1501. Further, if the distance from the current position of the manned vehicle to the backward boundary of the zone is shorter than the travel permission canceling distance (S1606/No), the travel-permitted zone setting section 322 does not cancel the travel-permitted zone until the distance from the current position of the dump truck to the backward boundary of the zone increases to the travel permission canceling distance or longer, and the manned vehicle travels.

The foregoing describes the operation upon acquisition of a zone by the manned vehicle on another lane as a travel-permitted zone for the own vehicle. The incorporation of such a contrivance makes it possible to move to another lane after acquiring a travel-permitted zone beforehand for the own vehicle on the another lane if it is desired to perform work on the another lane with the manned vehicle. Even if there is a vehicle about to pass the manned vehicle or there is an oncoming vehicle, it is possible to make such a vehicle stop before the travel-permitted zone set for the manned vehicle and hence to prevent it from coming into interference with the manned vehicle.

In this embodiment, the another-lane travel permitting section sets a travel-permitted zone of another-lane at a zone on another lane, the latter zone being adjacent and side by side with a first travel-permitted zone for the manned vehicle, in the auto-acquisition mode, so that a second travel-permitted zone superimposed on the travel-permitted zone of another-lane is not given to the dump truck 20. As a second travel-permitted zone is thus given to the dump truck only up to before the travel-permitted zone superimposed on the travel-permitted zone of another-lane, the dump truck stops as soon as it comes to the front boundary point of the second travel-permitted zone. As a consequence, when the manned vehicle is traveling on an oncoming lane adjacent the dump truck, the manned vehicle passes with the dump truck already coming to a stop. If a travel-permitted zone of another-lane has been given to a bulldozer for performing work there, the dump truck stops before the travel-permitted zone of another-lane and does not enter the travel-permitted zone of another-lane given to the bulldozer. Therefore, interference between the dump truck and the bulldozer can be avoided.

In this embodiment, an example has been described in which a zone on another lane is automatically selected when the zone of an another-lane acquisition button 140 is pressed with the auto-acquisition mode ON button 142 already activated. However, it may be configure so that, if the manned vehicle has traveled on the own lane in a state that the auto-acquisition mode ON button 142 is effective and a zone on another lane has already been permitted for traveling, the zone on the another lane may also be automatically updated together with the zone on the own lane in accordance with a conventional control method of travel-permitted zones. Specifically, it may be configured so that based on the travel-permitted zone on the own lane and the position of the own vehicle, the manned vehicle transmits the message of request for permission of a travel-permitted zone to the control server as needed and, when the control server sets a new travel-permitted zone for the manned vehicle, with reference to a zone to be newly set on the own lane based on conventional processing, a zone on an oncoming lane corresponding to the zone to be newly set is also set as a travel-permitted zone for the manned vehicle. In this modification, the cancellation of the travel-permitted zone on the oncoming lane may be performed based on the cancellation of the travel-permitted zone on the own lane. As a consequence, when it is desired, for example, to perform work for a substantial time with the manned vehicle in a wide range of area including the oncoming lane, it is no longer necessary to designate zones one by one on a terminal device so that the work can be efficiently performed.

Second Embodiment

In the second embodiment, a manned vehicle is allowed to pass a preceding vehicle on its own lane after acquiring a travel-permitted zone on another lane by using the navigation system 900.

Figure 17:
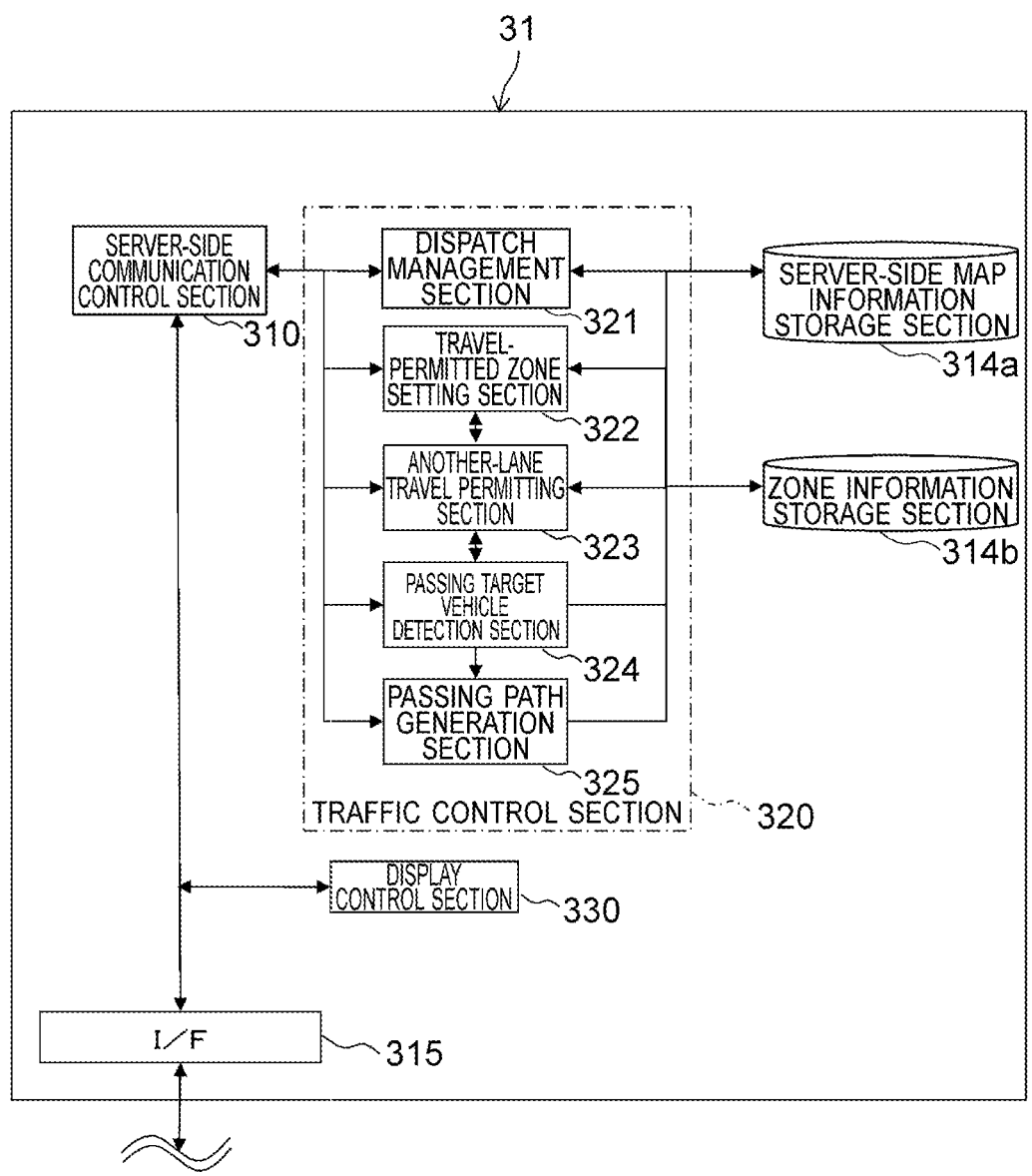
FIG. 17 is a functional block diagram depicting principal functions of a control server according to a second embodiment.

FIG. 17 is a functional block diagram depicting principal functions of a control server according to the second embodiment. The control server according to the second embodiment is different from the control server 31 of the first embodiment in that in addition to the configuration of the control server of the first embodiment, a passing target vehicle detection section 324 and a passing path generation section 325 are provided.

The passing target vehicle detection section 324 detects a passing target vehicle, which a dump truck should pass, from the state of a travel-permitted zone which the travel-permitted zone setting section 322 controls, for example, the time elapsed from the setting of the travel-permitted zone or the speed information of the dump truck or a manned vehicle as received via the server-side communication control section.

The passing path generation section 325 generates a passing path through which the passing vehicle passes the preceding passing target vehicle.

Figure 18A:
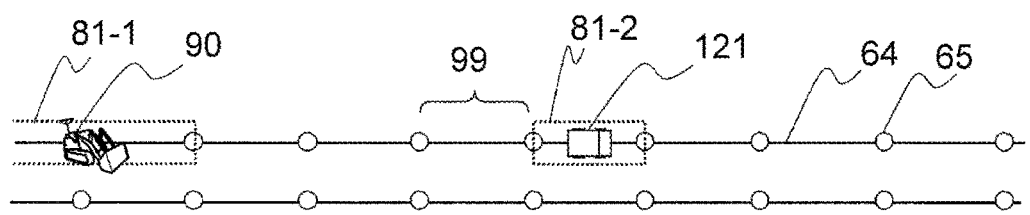
Figure 18B:
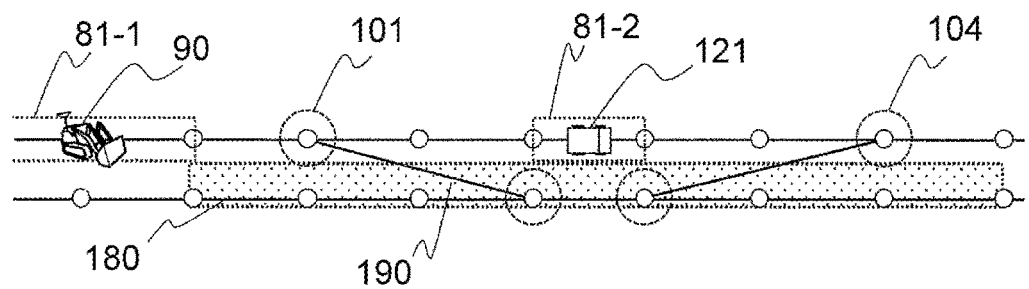
Figure 18C:
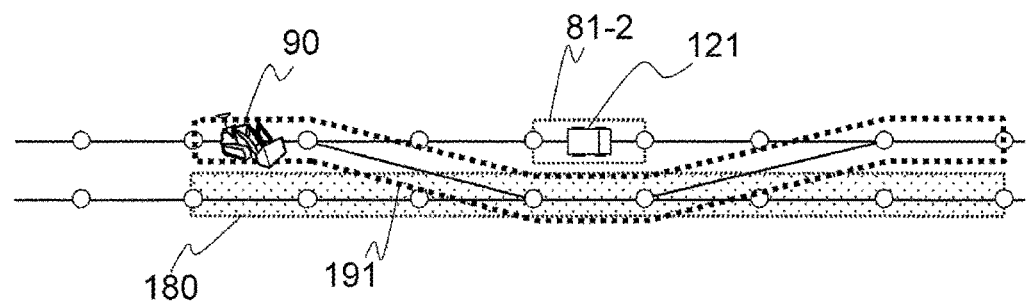

Referring to FIGS. 18A to 19, a description will next be made of operation when a dump truck performs passing in this system. FIGS. 18A to 18C are schematic diagrams describing a passing path and a travel-permitted zone in passing operation, in which FIG. 18A is a diagram depicting a passing vehicle and a passing target vehicle before initiation of the passing operation, and a positional relationship between travel-permitted zones for the respective vehicles, FIG. 18B is a diagram describing the outline of generation of the passing path, and FIG. 18C is a diagram describing the outlines of the travel-permitted zones to be set upon the passing operation. FIG. 19 is a flow chart describing the outline of the passing operation.

Firstly, in FIG. 18A, a dump truck 121 is a vehicle that is at stop on the travel path 64 for a cause such as a failure, and the bulldozer 90 is a vehicle traveling behind and toward the dump truck 121. For the bulldozer 90 and dump truck 121, travel-permitted zones 81-1,81-2 have been set, respectively.

In such a situation as described above, only under conventional control of travel-permitted zones, when the bulldozer 90 reaches a zone 99 immediately behind the dump truck 121, the bulldozer 90 decelerates and stops in the zone 99 because no travel permission has been given for the zone ahead of the zone 99 from the control server 31, and the bulldozer 90 cannot resume traveling until the dump truck 121 travels. To avoid this problem, the passing path generation section 325 of the control server 31 generates a passing path by using an adjacent lane (this adjacent lane may be either an oncoming lane or a passing lane, and will hereinafter be described by taking the oncoming lane as an example) so that the bulldozer 90 can continue traveling by going around the dump truck 121 which is at a stop. Hereinafter, the bulldozer 90 will be called "the passing vehicle", and the dump truck 121 will be called "the passing target vehicle". It is to be noted that a passing target may be, besides the dump truck which has developed a failure and is at a stop, an obstacle which is not a vehicle. If the passing target is an obstacle, the control server 31 may be configured so that the travel-permitted zone 81-2 is controlled as an entry-prohibited region by the travel-permitted zone setting section 322.

Referring to the positions and speeds of individual vehicles available from vehicle travel information received from them, the passing target vehicle detection section 324 detects a particular vehicle as a passing target vehicle if the speed of the particular vehicle is substantially slower compared with the speed specified for the travel lane at the position where the particular vehicle exists or if the particular vehicle is at a stop. Alternatively, it may also be configured so that with reference to the information from the travel-permitted zone setting section 322, the passing target vehicle detection section 324 detects a vehicle, for which a particular travel-permitted zone among individual travel-permitted zone sections in the map information has been set, as a passing target vehicle if the duration of the particular travel-permitted zone (the time elapsed from a clock time at which the particular travel-permitted zone was set for the vehicle currently existing in the particular travel-permitted zone) is longer than a corresponding estimated traveling time stored in the vehicle-side map information storage section 314 (FIG. 19, S1901).

If a passing target vehicle wishes to perform work on a passing path, in other words, an oncoming lane as in the case that a passing target vehicle is a bulldozer and a passing vehicle is a dump truck (a situation different from that of FIGS. 18A to 18C)(S1902/Yes), the passing target vehicle acquires a travel-permitted zone on the oncoming lane according to the relevant processing details described in the first embodiment (S1903). In this case, the passing vehicle cannot acquire the passing path as a travel-permitted zone. Therefore, the passing vehicle advances to a zone immediately before the passing path, and then waits until a travel permission is obtained for the passing path.

If a passing target vehicle is not performing work in a zone on a passing path and stays on the own lane (S1902/No), for example, if the passing target vehicle is a failure vehicle (a failure dump truck 121) and cannot move and the operator of a bulldozer 90 as a passing vehicle wishes to pass the failure vehicle and to travel toward a destination, the passing vehicle transmits the message of request for permission of a travel-permitted zone of an another-lane to the control server 31.

The another-lane travel permitting section 323 sets a travel-permitted zone of another-lane 180 at a partial zone including a zone that is on the another lane and is side by side with a zone ahead of the passing vehicle (FIG. 18B).

The passing path generation section 325 generates, ahead of the passing vehicle, a passing path 190 that connects from a starting point 101 of a transfer path to an end point 104 of the transfer path via the travel-permitted zone of another-lane. The travel-permitted zone setting section 322 sets, for the bulldozer 90, a first travel-permitted zone 191 on the passing path 190, and the bulldozer 90 travels along the first travel-permitted zone (S1904).

When the bulldozer 90 has passed through the passing path, the passing path generation section 325 deletes the passing path, and also cancels the travel-permitted zone of another-lane and the first travel-permitted zone (S1905).

The foregoing describes the passing control operation between the control server and the vehicles of different speeds upon performing passing between the vehicles. Upon performance of passing control operation in this system, the passing target vehicle may be a manned vehicle, and work such as sprinkling or leveling may be desired in an area on the oncoming lane at the timing of performance of passing. If the passing target vehicle turns so as to move to the oncoming lane at this time without noticing that the own vehicle will be soon passed by, the passing target vehicle may collide with the passing vehicle, potentially leading to a serious accident. Owing to the setting of a travel-permitted zone of another-lane for the manned vehicle as the passing target vehicle, however, it is possible to avoid interference with the passing vehicle during the work. If the manned vehicle is a passing vehicle, it is also possible for the manned vehicle to avoid being hit by a following vehicle traveling on the adjacent lane or colliding with an oncoming vehicle when the manned vehicle strays along the passing path onto the adjacent lane.

The above-described embodiments do not limit the present invention, various changes and modifications can be made within a scope not departing from the spirit of the present invention, and such changes and modifications belong to the technical scope of the present invention.

For example, the above-described embodiments are configured to make an acquisition request for a zone on another lane through a terminal device (the navigation system 900) on a manned vehicle, but may also be configured so that an operator at a control center designates a zone on another lane for a manned vehicle through a terminal device incorporated in the control server. In this configuration, the operator of the manned vehicle may contact the operator at the control center by wireless communication to request the designation of a zone on another lane, or the operator at the control center may make a determination in view of the situation of work by the manned vehicle to allocate a zone required for the work. If the operator at the control center designates and allocates a zone, its recipient is not necessarily limited to the manned vehicle and may be an unmanned vehicle or a worker who has a device provided with equivalent functions as the navigation system of the manned vehicle.

If configured as described above, it is possible for the operator at the control center to determine for which zone on another lane a travel permission is given to the manned vehicle by also taking the situations of other vehicles into consideration. Described specifically, even if a zone on another lane has not been allocated to another vehicle at the moment that the operator of the manned vehicle has become desirous to acquire the zone, it is possible—for example, when a dump truck (oncoming vehicle) traveling on an oncoming lane toward a destination has traveled there at a high speed—to allow the oncoming vehicle to pass first and then to allocate the oncoming lane to the manned vehicle to perform work. As is understood from the foregoing, the control of travel-permitted zones at the control center makes it possible to make determinations by taking an overview of surrounding situations and to perform efficient system operation as a whole.

In the first embodiment, the description was made about the example in which, as the operation when the zone of an oncoming-lane cancellation button is pressed, a cancellation request for a travel-permitted zone of an oncoming-lane is transmitted if a manned vehicle is located on the own lane and is in a correct direction relative to the traveling direction of the zone. However, the above-described determination is not necessarily limited to the situation that the vehicle exists on the own lane, and a cancellation request for a travel-permitted zone of an oncoming-lane may be transmitted even if a vehicle is located on an oncoming lane and is in a correct direction relative to the traveling direction of the zone. In this case, the travel-permitted zone cancelled by the control server becomes a travel-permitted zone set on the side of the original own lane.

If configured as described above, it is possible to vacate a travel-permitted zone on the original own lane and to perform more flexible system operation if the vehicle has changed its destination and makes a U-turn on a haul road or if a vehicle which has caught up to the own vehicle during work on a haul road is allowed to pass.

LEGENDS 1 traffic control system
20 Dump truck
31 Control server (traffic control device)
90 Manned vehicle
131 First travel-permitted zone
137 Travel-permitted zone of another-lane

The invention claimed is:

1. A traffic control system that connects a manned vehicle, which is traveling according to operation by an operator on one of plural lanes arranged side by side in a mine, and a traffic control device, which performs traffic control of the manned vehicle, together via a wireless communication network;

the traffic control device comprising:

a travel-permitted zone setting section that sets a zone of the lane, on which the manned vehicle is traveling, as a first travel-permitted zone with a travel permission given to the manned vehicle only, an another-lane travel permitting section that sets, as a travel-permitted zone of another-lane with a travel permission given to the manned vehicle only, a zone located on a lane adjacent to the lane, on which the manned vehicle is traveling, and including at least a part of a zone arranged side by side with the first travel-permitted zone, and a controller-side communication control section that transmits, to the manned vehicle, information indicating positions of the travel-permitted zone and the travel-permitted zone of another-lane; and the manned vehicle comprising:

a command input accepting section that accepts an operation which makes a setting request for the travel-permitted zone of another-lane on the lane adjacent the lane on which the manned vehicle is traveling, a display control section that displays the travel-permitted zone of another-lane on a screen, a terminal-side communication control section that to and from the traffic control device, transmits the setting request and receives the information indicating the position of the travel-permitted zone of another-lane, respectively, wherein the command input accepting section additionally accepts an operation with makes a cancellation request for the travel-permitted zone of another-lane, and wherein the another-lane travel permitting section cancels, in response to the cancellation request, the setting of the travel-permitted zone of another-lane if the manned vehicle has a body included in the first travel-permitted zone and is in a direction matching a travelling direction of the first travel-permitted zone or if the manned vehicle has a body included in the travel-permitted zone of another-lane and is in a direction matching a traveling direction of the travel-permitted zone of another-lane.

2. The traffic control system according to claim 1, wherein:

the travel-permitted zone setting section additionally sets, in one of the plural lanes on which one lane an autonomous traveling vehicle is autonomously traveling, a second travel-permitted zone, for which a travel permission is given to the autonomous traveling vehicle only, at a zone where the first travel-permitted zone or the travel-permitted zone of another-lane has not been set.

3. The traffic control system according to claim 1, wherein:

following setting of a new first travel-permitted zone for the manned vehicle by the travel-permitted zone setting section, the another-lane travel permitting section sets a new travel-permitted zone of another-lane at a zone arranged side by side with the new first travel-permitted zone.

4. The traffic control system according to claim 1, wherein:

the travel-permitted zone of another-lane is a zone including a zone that is arranged on the adjacent lane side by side with the first travel-permitted zone.

5. The traffic control system according to claim 1, wherein:

the traffic control device further comprises a passing path generation section that generates a passing path, which allows the manned vehicle to avoid a front obstacle, on the lane adjacent the lane on which the manned vehicle is traveling, and the passing path generation section generates the passing path in the travel-permitted zone of another-lane set for the manned vehicle.

6. A traffic control device that performs traffic control of a manned vehicle traveling according to operation by an operator on one of plural lanes arranged side by side in a mine, comprising:

a travel-permitted zone setting section that sets a zone of the lane, on which the manned vehicle is traveling, as a first travel-permitted zone with a travel permission given to the manned vehicle only, an another-lane travel permitting section that sets, as a travel-permitted zone of another-lane with a travel permission given to the manned vehicle only, a zone located on a lane adjacent to the lane, on which the manned vehicle is traveling, and including at least a part of a zone arranged side by side with the first travel-permitted zone, and a controller-side communication control section that transmits, to the manned vehicle, information indicating positions of the travel-permitted zone and the travel-permitted zone of another-lane, wherein the another-lane travel permitting section cancels the setting of the travel-permitted zone of another-lane if the manned vehicle has a body included in the first travel-permitted zone and is in a direction matching a travelling direction of the first travel-permitted zone or if the manned vehicle has a body included in the travel-permitted zone of another-lane and is in a direction matching a traveling direction of the travel-permitted zone of another-lane.

7. An on-board terminal device to be mounted in a manned vehicle that travels according to operation by an operator on one of plural lanes arranged side by side in a mine, comprising:

a command input accepting section that accepts operation which makes a setting request for a travel-permitted zone of another-lane, with a travel permission being given to only an own vehicle with the on-board terminal device mounted therein, on a lane adjacent the lane on which the own vehicle is traveling, a display control section that displays a position of the travel-permitted zone of another-lane, a terminal-side communication control section that to and from a traffic control device which performs traffic control for the manned vehicle, transmits the setting request and receives information indicating the position of the travel-permitted zone of another-lane, respectively; and a terminal-side map information storage section that stores map information defining positions of the plural lanes and traveling directions of the respective lanes, wherein, if an operation performed on the command input accepting section to cancel the setting of the already-set travel-permitted zone of another-lane when the traffic control device has set a zone of the lane, on which the manned vehicle is traveling, as a travel-permitted zone with a travel permission given to the manned vehicle only, and if the terminal-side communication control section has received the information indicating the position of the travel-permitted zone, the command input accepting section acquires a position of the own vehicle from a position calculating device mounted on the own vehicle, refers to the position of the own vehicle and the map information, and accepts a cancellation request operation to cancel the setting of the travel-permitted zone of another-lane if the own vehicle has a body included in the travel-permitted zone and the body of the own vehicle is in a direction matching a traveling direction of the travel-permitted zone or if the body of the own vehicle is included in the travel-permitted zone of another-lane and the direction of the body of the own vehicle matches a traveling direction of the travel-permitted zone of another-lane.

8. The on-board terminal device according to claim 7, wherein:

upon acceptance of operation for selection of desired two points with the adjacent lane interposed between the two points, the command input accepting section generates a rectangular area including the two points as diagonally opposite vertices thereof and extracts a zone on the another lane, which zone is included in the rectangular area, as an acquisition request zone in which a request is made for acquisition as the travel-permitted zone of another-lane, or designates desired two segments on the another lane and extracts a series of segments, which include the desired two segments, as the acquisition request zone.

9. The on-board terminal device according to claim 7, wherein:

if the own vehicle changes in position in association with traveling of the own vehicle, the command input accepting section additionally accepts operation for requesting resetting of the travel-permitted zone of another-lane following the change in the position of the own vehicle.

10. The on-board terminal device according to claim 7, wherein:

the plural lanes comprise at least three lanes, and the command input accepting section additionally accepts operation that designates on which one of left and right lanes relative to a traveling direction of the own vehicle the travel-permitted zone of another-lane is to be set, and also input operation of the number of one or more lanes where the travel-permitted zone of another-lane is to be set.

* * * * *